(12) United States Patent
Lee et al.

(10) Patent No.: US 6,795,908 B1
(45) Date of Patent: Sep. 21, 2004

(54) METHOD AND APPARATUS FOR INSTRUCTION EXECUTION IN A DATA PROCESSING SYSTEM

(75) Inventors: Lea Hwang Lee, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 704 days.

(21) Appl. No.: 09/591,938

(22) Filed: Jun. 12, 2000

Related U.S. Application Data

(63) Continuation-in-part of application No. 09/505,163, filed on Feb. 16, 2000, now abandoned.

(51) Int. Cl.[7] .................. G06F 15/177; G06F 13/40; G06F 9/45
(52) U.S. Cl. .................. 712/4; 712/229; 717/160
(58) Field of Search .................. 712/5, 241, 222, 712/7, 3, 221, 224, 225, 220, 4, 227, 231, 229, 205; 717/160, 159; 711/202

(56) References Cited

U.S. PATENT DOCUMENTS

| | | | | |
|---|---|---|---|---|
| 5,361,354 A | * | 11/1994 | Greyzck | 717/160 |
| 5,530,804 A | * | 6/1996 | Edgington et al. | 714/30 |
| 5,799,163 A | * | 8/1998 | Park et al. | 712/205 |
| 5,903,769 A | * | 5/1999 | Arya | 712/5 |
| 6,081,880 A | * | 6/2000 | Sollars | 711/202 |
| 6,292,886 B1 | * | 9/2001 | Makineni et al. | 712/222 |

OTHER PUBLICATIONS

Jouppi, Norman P. et al.; "A Unified Vector/Scalar Floating–Point Architecture"; WRL Research Report 89/8; Jul. 1989; pp. 1–23; Digital Western Research Laboratory, Palo Alto.

Wulf, William A.; "Evaluation of the WM Architecture"; ACM 1992; pp 382–390.

Analog Devices; ADSP–2106x SHARC™ User's Manual (second edition); 7/96; pp 1–1 to 11–48 and A–1 to X12; Analog Devices, Inc.; Norwood, MA.

Analog Devices; "ADSP–2100 Family User's Manual"; pp 1–1 to 15–106 and A–1 to X–6; Analog Devices, Inc.; Norwood, MA.

* cited by examiner

*Primary Examiner*—Daniel H. Pan
(74) *Attorney, Agent, or Firm*—Joanna G. Chiu

(57) ABSTRACT

A method for processing scalar and vector executions, where vector executions may be "true" vector operations, CVA, or pseudo-vector operations, PVA. All three types of executions are processed using one architecture. In one embodiment, a compiler analyzes code to identify sections that are vectorizable, and applies either CVA, PVA, or a combination of the two to process these sections. Register overlay is provided for storing load address information and data in PVA mode. Within each CVA and PVA instruction, enable bits describe the data streaming function of the operation. A temporary memory, TM, accommodates variable size vectors, and is used in vector operations, similar to a vector register, to store temporary vectors.

38 Claims, 14 Drawing Sheets

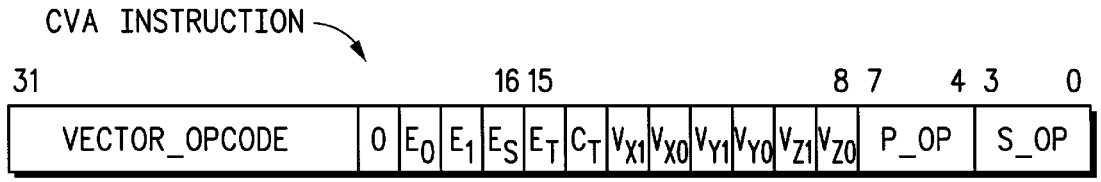

```
CVA INSTRUCTION
31                           16 15                                    8 7    4 3   0
┌─────────────────────────────┬──┬──┬──┬──┬──┬──┬───┬───┬───┬───┬───┬───┬──────┬──────┐
│      VECTOR_OPCODE          │0 │E₀│E₁│Eₛ│Eₜ│Cₜ│Vₓ₁│Vₓ₀│Vᵧ₁│Vᵧ₀│V_{Z1}│V_{Z0}│ P_OP │ S_OP │
└─────────────────────────────┴──┴──┴──┴──┴──┴──┴───┴───┴───┴───┴───┴───┴──────┴──────┘
```

VECTOR_OPCODE: OPCODE FOR VECTOR INSTRUCTIONS $E_0/E_1/E_S$: ENABLE BITS FOR DATA STREAMS $L_0$, $L_1$ AND S, RESPECTIVELY $V_{X0}/V_{X1}$: DEFINED AS FOLLOWS:
- $V_{X1}V_{X0}=00$  OPERAND X SOURCES FROM R3
- $V_{X1}V_{X0}=01$  OPERAND X SOURCES FROM $L_0$
- $V_{X1}V_{X0}=10$  OPERAND X SOURCES FROM $L_1$
- $V_{X1}V_{X0}=11$  OPERAND X SOURCES ZERO $V_{Y0}/V_{Y1}$: DEFINED AS FOLLOWS:
- $V_{Y1}V_{Y0}=00$  OPERAND Y SOURCES FROM R4
- $V_{Y1}V_{Y0}=01$  OPERAND Y SOURCES FROM $L_0$
- $V_{Y1}V_{Y0}=10$  OPERAND Y SOURCES FROM $L_1$
- $V_{Y1}V_{Y0}=11$  OPERAND Y SOURCES ZERO $V_{Z0}/V_{Z1}$: DEFINED AS FOLLOWS:
- $V_{Z1}V_{Z0}=00$  OPERAND Z SOURCES FROM R5 (COMPOUND CVA)
- $V_{Z1}V_{Z0}=01$  OPERAND Z SOURCES FROM $L_0$ (COMPOUND CVA)
- $V_{Z1}V_{Z0}=10$  OPERAND Z SOURCES FROM $L_1$ (COMPOUND CVA)
- $V_{Z1}V_{Z0}=11$  OPERAND Z SOURCES ZERO (REDUCTION AND HYBRID CVA)

$E_T$: ENABLE BIT FOR EARLY TERMINATION $C_T$: CONDITION CODE FOR EARLY TERMINATION

P_OP: OPCODE FOR PRIMARY ARITHMETIC

S_OP: OPCODE FOR SECONDARY ARITHMETIC

*FIG. 7*

VECTOR_OPCODE: OPCODE FOR VECTOR INSTRUCTIONS
$E_0/E_1/E_S$: ENABLE BITS FOR DATA STREAMS $L_0$, $L_1$ AND S, RESPECTIVELY
$E_T$: ENABLE BIT FOR EARLY TERMINATION
$C_T$: CONDITION CODE FOR EARLY TERMINATION
CS-STORE-INDEX: INDEX OF THE INSTRUCTION IN THE LOOP BODY THAT WILL INITIATE A CS-STORE OPERATION
LOOP_SIZE: SIZE OF THE LOOP BODY IN NUMBER OF INSTRUCTIONS

STR$_0$/STR$_1$/STR$_S$: STRIDE VALUE FOR L$_0$, L$_1$ AND S, RESPECTIVELY.
SZ$_0$/SZ$_1$/SZ$_S$:  OPERAND SIZE FOR L$_0$, L$_1$ AND S, RESPECTIVELY.
THEY ARE DEFINED AS FOLLOWS:  0x  WORD
10  HALFWORD
11  BYTE

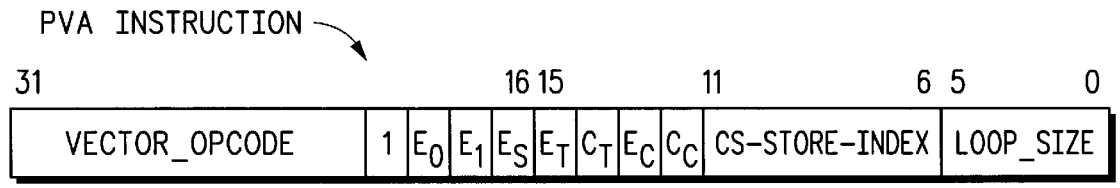

VECTOR_OPCODE: OPCODE FOR VECTOR INSTRUCTIONS
$E_0/E_1/E_S$: ENABLE BITS FOR DATA STREAMS $L_0$, $L_1$ AND S, RESPECTIVELY
$E_T$: ENABLE BIT FOR EARLY TERMINATION
$C_T$: CONDITION CODE FOR EARLY TERMINATION
$E_C$: ENABLE BIT FOR EARLY CONTINUATION
$C_C$: CONDITION CODE FOR EARLY CONTINUATION
CS-STORE-INDEX: INDEX OF THE INSTRUCTION IN THE LOOP BODY THAT WILL INITIATE A CS-STORE OPERATION
LOOP_SIZE: SIZE OF THE LOOP BODY IN NUMBER OF INSTRUCTIONS

*FIG.20*

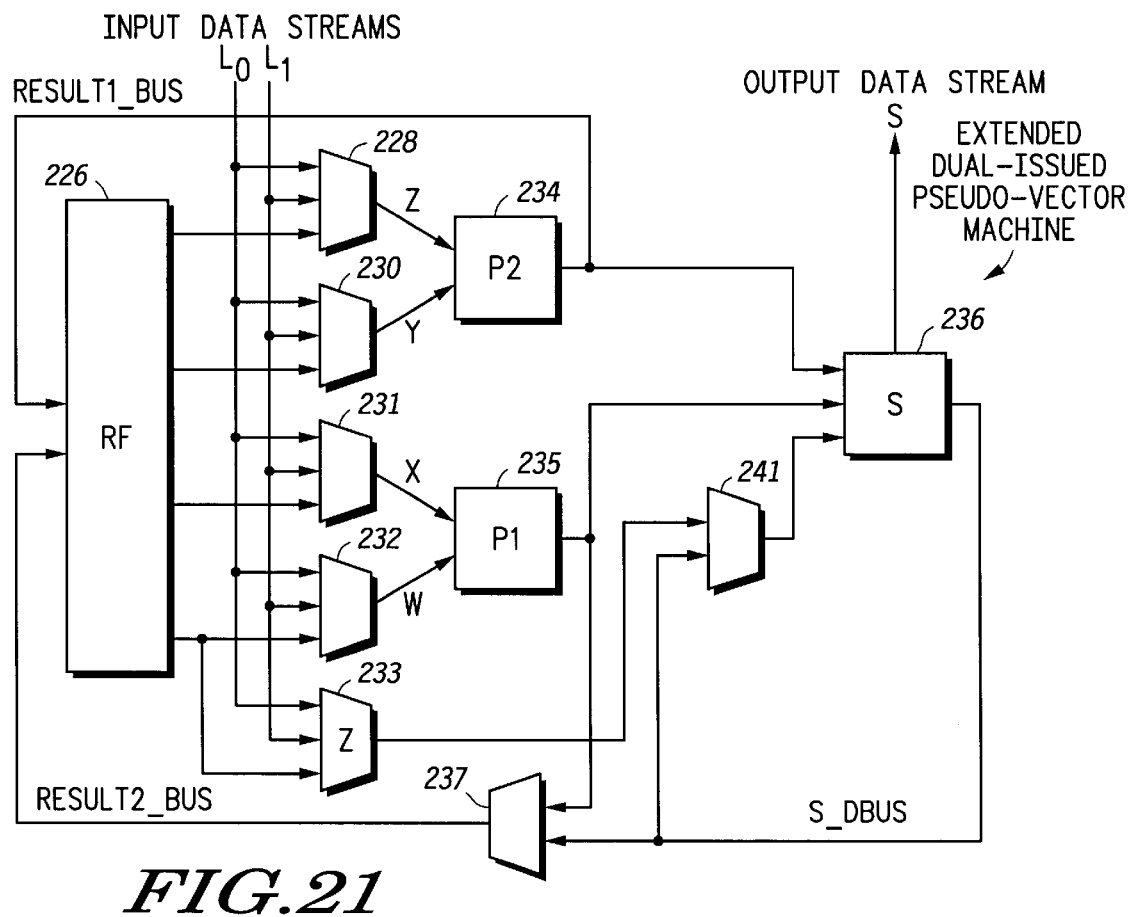

*FIG.21*

SOURCE W
$L_0$, $L_1$, R0,
$\{0, L_0[31:16]\}$

SOURCE X
$L_0$, $L_1$, R4, $\{0, L_1[15:0]\}$,
$\{0, L_1[31:16]\}$

SOURCE Y
$L_0$, $L_1$, R8, $\{0, L_1[31:16]\}$,
$\{0, L_1[15:0]\}$

SOURCE Z
$L_0$, $L_1$, R12,
$\{0, L_0[15:0]\}$

P1_OP → S_OP ← P2_OP
↓
S (A) COMPOUND CVA
(S ENABLED)

SOURCE W
$L_0$, $L_1$, R0,
$\{0, L_0[31:16]\}$

SOURCE X
$L_0$, $L_1$, R4, $\{0, L_1[15:0]\}$,
$\{0, L_1[31:16]\}$

SOURCE Y
$L_0$, $L_1$, R8, $\{0, L_1[31:16]\}$,
$\{0, L_1[15:0]\}$

SOURCE Z
$L_0$, $L_1$, R12,
$\{0, L_0[15:0]\}$

P1_OP → S_OP ← P2_OP
↓
R3

(B) REDUCTION CVA
(S DISABLED)

SOURCE W
$L_0$, $L_1$, R0,
$\{0, L_0[31:16]\}$

SOURCE X
$L_0$, $L_1$, R4, $\{0, L_1[15:0]\}$,
$\{0, L_1[31:16]\}$

SOURCE Y
$L_0$, $L_1$, R8, $\{0, L_1[31:16]\}$,
$\{0, L_1[15:0]\}$

SOURCE Z
$L_0$, $L_1$, R12,
$\{0, L_0[15:0]\}$

P1_OP → S_OP ← P2_OP
↓
S AND R3

(C) HYBRID CVA
(S ENABLED)

*FIG.22*

METHOD AND APPARATUS FOR INSTRUCTION EXECUTION IN A DATA PROCESSING SYSTEM

CROSS-REFERENCE TO RELATED APPLICATION

This application is a continuation-in-part of U.S. patent application Ser. No. 09/505,163, filed Feb. 16, 2000, now abandoned, entitled "Method And Apparatus for Instruction Execution In A Data Processing System", which is hereby incorporated by reference in its entirety.

FIELD OF THE INVENTION

This invention relates generally to instruction execution in a data processing system, and more specifically to a data processing system having a scalar execution mode and a vector execution mode, where the vector execution mode includes a true vector mode for processing highly vectorizable loops and a pseudo-vector mode for processing loops that are difficult to vectorize.

RELATED ART

Recently much attention has been focused on designing low-cost, low-power and high performance processors for mid-to-low end embedded applications, such as pagers, cellular phones, etc. Many of these, embedded applications require the data processing system to perform highly repetitive functions, such as digital signal processing (DSP) functions, where a large amount of Instruction Level Parallelism (ILP) can be exploited, while also requiring the system to perform control intensive functions.

To address these needs, some systems use dual-core solutions, where one core performs all the control intensive functions, and the other core performs the specialized DSP functions. In this approach, the processor cores communicate with each other through communication channels implemented within the system, such as a shared memory. These systems often employ dual instruction streams, one for each execution core. These dual core systems typically have higher hardware and development costs.

In addition, in many embedded applications, some loops are highly vectorizable, while other loops are more difficult to vectorize. Highly vectorizable loops can be efficiently processed by using the traditional vector processing paradigm, such as those described in "Cray-1 Computer System Hardware Reference Manual", Cray Research, Inc., Bloomington, Minn., publication number 2240004, 1977. This is applicable to the vectorizable loops, but does not extend to those loops that are difficult to vectorize.

For loops that are difficult to vectorize, a DSP style of processing paradigm, which focuses on optimizing loop executions will be more suitable. The SHARC product described in the ADSP-2106x SHARC User's Manual, Analog Devices Inc., 1997, is an example of a system employing loop optimization. While providing efficient performance of loops that are difficult to vectorize, this approach is not as efficient for highly vectorizable loops.

A need exists, therefore, for a low-cost data processing system to efficiently perform both control and repetitive loop functions. Further, a need exists for a low cost, efficient processing system that handles both vector and DSP style processing using a single set of functional units responsive to the type of loop to be processed.

BRIEF DESCRIPTION OF THE DRAWINGS

The present invention is illustrated by way of example and not limitation in the accompanying figures, in which like references indicate similar elements, and in which:

FIG. 7 illustrates in block diagram form the format of a CVA instruction, according to one embodiment of the present invention.

FIG. 20 illustrates in block diagram form an alternative embodiment of a PVA instruction with early loop continuation capability.

FIG. 21 illustrates in block diagram form a pseudo-vector machine according to an alternate embodiment of the present invention.

FIG. 22 illustrates in data flow diagram form a dependency graph of a pseudo-vector machine as in FIG. 21 according to one embodiment of the present invention.

Figure 1:
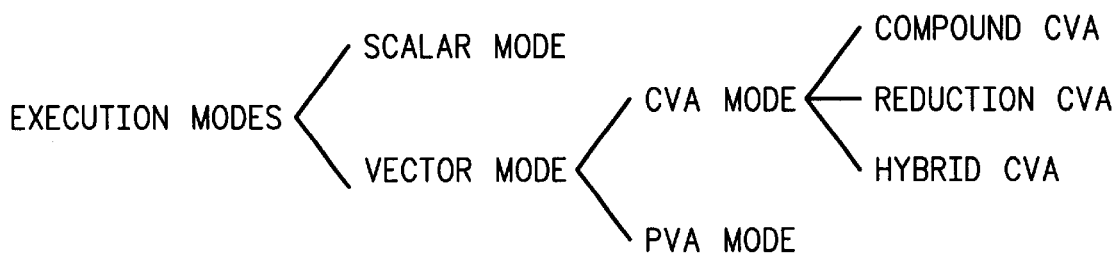
FIG. 1 illustrates in outline diagram form execution modes in a data processing system according to one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The present invention provides a method for performing scalar functions and vector functions in an integrated datapath. Scalar functions may also be considered as control functions, while vector functions are typically for replacing and executing repetitive program loops. The method chooses between a traditional vector processing paradigm or a DSP style of processing paradigm, depending on the nature of the loop. By providing the ability to execute both of these processing paradigms for program loops, it is possible to achieve performance improvements that are higher than either individual paradigm.

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets is used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

In a vector processing paradigm, data continuously streams from the memory, or vector registers, and are processed by a chain of functional units in a highly pipelined fashion. The processed data then continuously stream back to the memory. The Cray architecture, discussed hereinabove, is an early example of a system using this paradigm.

The strength of vector processing paradigm can be illustrated using the following example loop.

EXAMPLE 1

```
L1:
    addi    R2, 2       // update stride value
    ld.h    R7, (R2)    // load with stride of 2
    addi    R3, 1       // update stride value
    ld.b    R6, (R3)    // load with stride of 1
    mul     R7, R6      // multiply
    st.h    R7, (R2)    // store with stride of 2
    dec.ne  R1          // decrement loop index r1
                        // set c bit if r1 not equals zero
    bt      L1          // branch to L1 if c bit is set
```

This loop performs an element-wise multiplication on two vectors. In vector form, it is performing: C[i]=A[i]*B[i], i=0, . . . , n−1, for vectors A, B and C.

In this example, intermediate values are produced and then consumed immediately. These values are continuously being written back to and read from registers r6 and r7. Since they are produced and consumed only once, it is inefficient to store these values in the often limited register storage space. This situation, unfortunately, is inevitable when a vector operation is expressed using a scalar program in a load-store instruction set architecture (ISA).

A more efficient approach, is to chain a number of functional units together, with each unit performing a specific task. In this way, when an intermediate value is produced by a functional unit, it is directly passed on to the next functional unit down the chain, thereby avoiding the read, and write traffic to the register file associated with storing and retrieving the value.

It is also possible to pipeline vector operations or executions, such that one result could be produced every cycle. In general, the time required to perform a vector operation is given by Ts+n/Tr, where Ts is the initial setup cost, n is the vector length and Tr is the throughput rate in number of results produced per cycle. If a scalar machine takes m cycles to execute one iteration of the equivalent program loop, then the speedup using the vector machine is given by nm/(Ts+n/Tr), or nm/(Ts+n) for Tr=1. Maximum speedup could be achieved when Ts is sufficiently small and n is sufficiently large. In this case, the speedup approaches m, the number of cycles it takes for the scalar machine to execute one iteration of the program loop.

Vector processing has several strengths. Various operations may be pipelined on a single data stream resulting in improved performance. Efficient data storage and movement results as a large amount of temporary data are produced and consumed by adjacent functional units without going through the register file or the memory system. Additionally, vector processing uses a smaller routing area as a functional unit is routed directly to its destination function unit, instead of broadcasting it to the entire datapath. Efficient data movements and lower routing area tend to reduce power consumption. Still further, a lower instruction fetch bandwidth is achieved as there is no need to request an instruction during vector executions. The strength of vector processing paradigm makes it very suitable for the low-cost, low-power embedded computing systems.

A loop that performs a vector operation described by:

$$C[i]=A[i]*B[i], \text{ for } i=0, \ldots, n-1.$$

for some vectors A, B and C, is a highly vectorizable loop. The ease of loop vectorization is typically a function of the hardware and system configuration. In general, loops that do not depend on run-time information to decide which arithmetic function to perform are easier to vectorize. As used herein, Canonical Vector Arithmetic (CVA) represents the vector arithmetic that can be performed by highly vectorizable loop(s). The following shows another example of CVA.

$$C[i]=4*A[i]+(B[i]>>1), \text{ for } i=0,\ldots,n-1.$$

This CVA can be decomposed into multiple CVAs, as follows.
T1[i]=4*A[i]; T2[i]=B[i]>>1; C[i]=T1[i]+T2[i], for i= 0, . . . , n−1, for some temporary vectors T1 and T2.

When a DSP algorithm or function is implemented on an embedded machine, it is often transformed into program loops. The optimizing compiler then tries to restructure the loop such that all the possible parallelism can be easily exploited by the machine. Some program loops, however, are not easy to vectorize. They may become vectorizable after being transformed by the compiler to "fit" the vector processing paradigm. These transformations involve adding some additional vector operations that may include mask generations, gather and scatter operations, etc.

For example, a loop that performs a vector operation described by:

$$C[i]=(A[i]>B[i])? \, A[i]^2 : A[i]+B[i], \text{ for } i=0,\ldots,n-1,$$

is difficult or costly to vectorize. In particular, the loop dynamically relies on the condition:

$$A[i]>B[i]$$

to decide what arithmetic function to be performed in order to obtain the result element C[i]. This type of arithmetic is referred to herein as the Pseudo-Vector Arithmetic (PVA).

A DSP type machine executes the PVA arithmetic efficiently, by optimizing the executions of program loops. These machines improve the performance by removing much of the overhead associated with: (i) the loop control mechanism; (ii) the constant-stride load; and (ii) the constant-stride store.

An instruction in traditional DSP processors can specify that multiple compute and memory operations be performed concurrently. The operations of such processors are very similar to those for Very Long Instruction Word (VLIW) processors, where multiple operations are issued in parallel.

The present invention provides a mean for processing vectorizable loops using vector type processing and difficult or impossible to vectorize loops using DSP type processing. Depending on the type of loops, the machine behaves like a vector processor under certain conditions; and behaves like a DSP processor under other conditions. In addition, this machine uses a single data path to execute all the vector arithmetic as well as the scalar portions (i.e. the non-loop portions) of the program, allowing efficient reuse of the same hardware resources.

The present invention incorporates vectorization as a decision mechanism to determine whether to use vector type processing or DSP type processing. The former is also referred to as CVA execution(s). The latter is also referred to as PVA execution(s). This new processing paradigm will be referred to herein as the "Pseudo-Vector Machine."

According to this new processing paradigm, the execution model is capable of executing in two modes: (i) a scalar execution mode for control functions; and (ii) a vector execution mode for exploiting instruction level parallelism (ILP). FIG. 1 illustrates the execution modes of one embodiment of the present invention. The two basic modes are scalar and vector, where the vector mode includes further specific modes of execution. The CVA and PVA modes are only available in vector mode, and there are three types of CVA mode executions: (i) compound; (ii) reduction; and (iii) hybrid. Correspondingly, there are two vector instructions on this machine: a CVA instruction and a PVA instruction.

In the execution model of FIG. 1, scalar and vector modes are non-overlapping in time. The model executes these two modes on a single datapath using a single instruction stream. Each instruction in this stream can be classified as either a scalar instruction or a vector instruction. When a vector instruction is fetched and decoded, the machine enters a vector execution mode. The machine only exits the vector mode via a few predefined mechanisms.

For loops that are highly vectorizable, the machine uses the CVA execution mode, i.e. a "true" vector processing paradigm, to process the loops. For loops that are difficult or impossible to vectorize, the machine uses the PVA execution mode, i.e. a "pseudo" vector processing paradigm similar to the DSP's style of processing, to process the loop. The optimizing compiler, in this case, decides which execution mode is best suited for a given program loop. In general, the compiler will first try to vectorize a loop using a true vector, or CVA instruction, in an attempt to exploit the low-power and high performance aspects of vector processing paradigm. If this is not possible, it will then fail back to the DSP style loop-based executions using a PVA instruction, or a combination of both.

Vectorization, in a conventional sense, refers to identifying and replacing a vectorizable program loop with some equivalent vector operations. In addition the present invention provides vectorization which identifies and replaces a program loop with a DSP style loop construct. This may include a DO UNTIL or DO WHILE instruction. Such a loop may be difficult or impossible to vectorize, in a conventional sense. In the pseudo-vector machine, the PVA instruction is used to construct and vectorize DSP type program loops.

When a program loop is replaced by its equivalent code that consists of one or more vector instructions (CVA and/or PVA instructions), the program loop is said to be vectorized. This vectorized code segment is also referred to as the vector equivalent of the original scalar program loop, as they both perform the same function. Vectorization can occur at the assembly level or at the source code level.

If a loop is vectorizable using a CVA construct, it is said to be CVA vectorizable. If a loop is vectorizable using a PVA construct, it said to be PVA vectorizable. If a loop is CVA vectorizable, it is also PVA vectorizable. The converse, however, is not generally true. The PVA construct represents a more general vectorizing mechanism. With comparable hardware costs, CVA executions usually offer higher performance benefits for loops that are highly vectorizable. For loops that are impossible or too costly to vectorize, the PVA executions offer better performance benefits.

Figure 2:
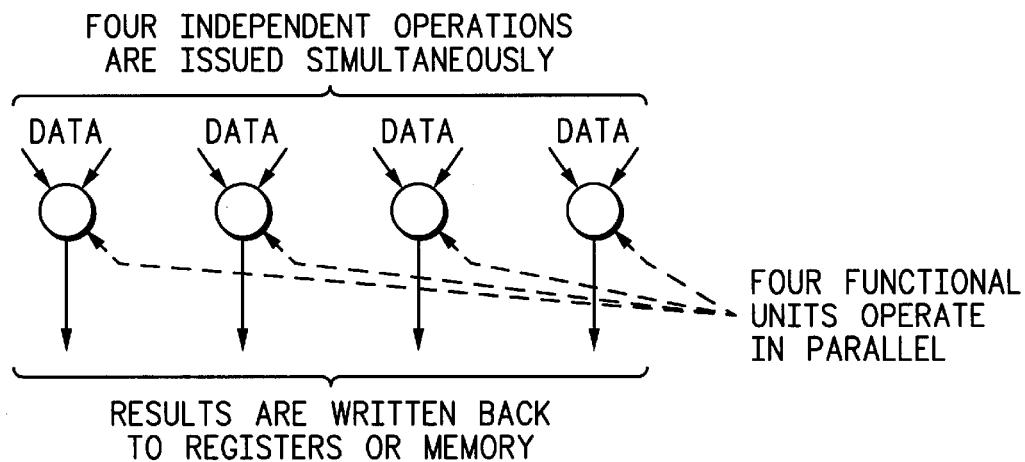
FIG. 2 illustrates in block diagram form operation of functional units in a DSP processor.
Figure 3:
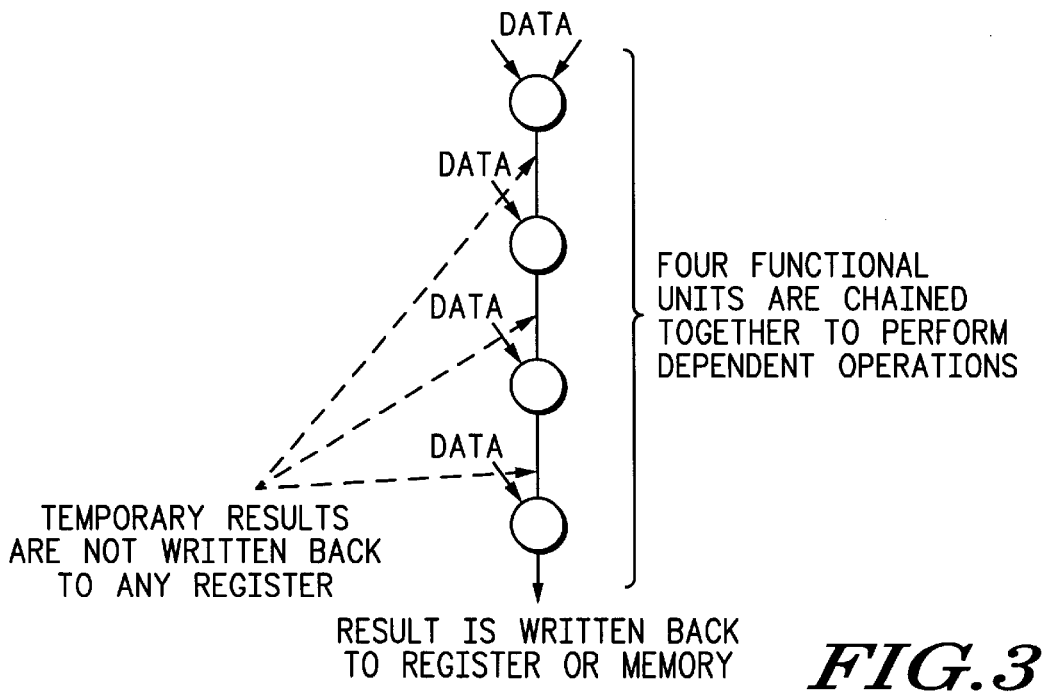
FIG. 3 illustrates in block diagram form operation of functional units in of a true vector machine.

The distinctions between a DSP and/or VLIW type execution and a vector type execution are illustrated in FIGS. 2 and 3. FIG. 2 illustrates the operations of a DSP type execution, where multiple independent operations are issued simultaneously to multiple functional units. The results produced by these independent functional units are written back to some architectural registers and/or the memory system. Note that the operations illustrated in FIG. 2 also describe operations of a VLIW machine.

FIG. 3 illustrates traditional vector execution, where multiple functional units are chained together to perform dependent operations. Temporary results produced between the chained functional units are not written back to an architectural register nor are they written to the memory system. In addition, a vector execution is also characterized by the fact that after the initial fetching and decoding of the vector instruction, it does not make any further instruction request for the rest of its vector execution.

The present invention provides a method of combining DSP type executions and vector execution in one integrated datapath. As used herein, PVA executions are DSP type executions, while CVA executions are vector executions. The present invention thus takes advantage of the benefits of each type of execution within one processing system.

Figure 4:
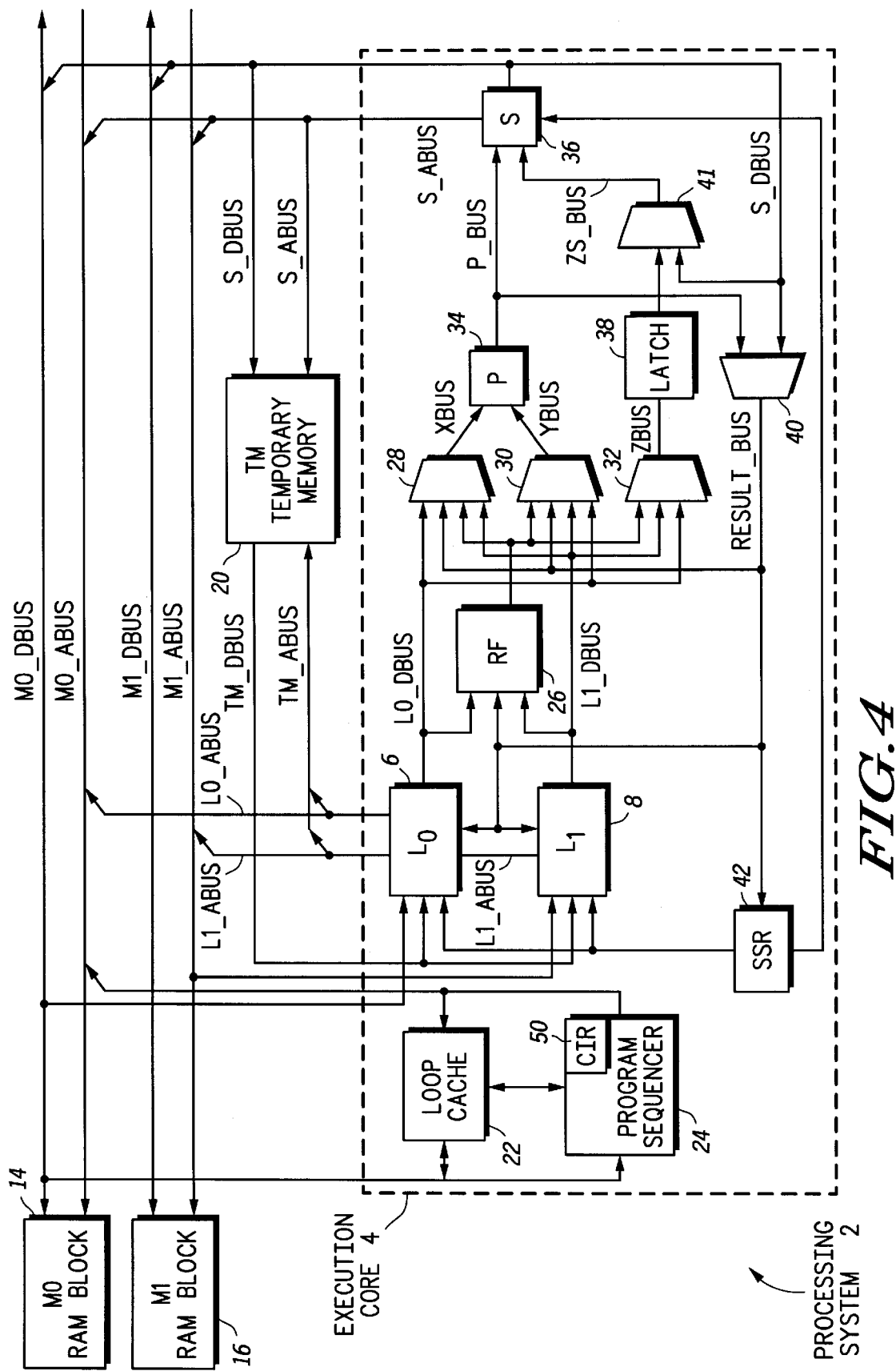
FIG. 4 illustrates in block diagram form a processing system adapted for processing pseudo-vector arithmetic operations according to one embodiment of the present invention.

FIG. 4 illustrates a processing system 2 according to one embodiment of the present invention. Processing system 2 incorporates a processing architecture to perform scalar executions, CVA executions, and PVA executions on a single datapath. The execution core 4 includes a first load unit, $L_0$ 6, and a second load unit, $L_1$ 8. Information is loaded into $L_0$ 6 and $L_1$ 8 from memory M0 14 and memory M1 16, respectively.

In one embodiment of the present invention, M0 14 and M1 16 are random access memory (RAM) blocks, but may be implemented using other types of memory storage devices. The memory M0 14 communicates data information with the rest of processing system 2 via M0_dbus, and address information via M0_abus. Similarly, M1 16 communicates data information via M1_dbus, and address information via M1_abus.

Figure 11:
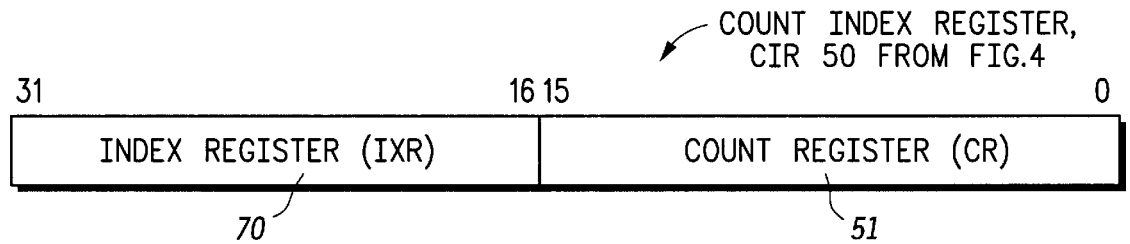
FIG. 11 illustrates in block diagram form the format of the Count Index Register, CIR, according to one embodiment of the present invention.

The execution core 4 also includes a loop cache 22 coupled to a program sequencer 24, M0_dbus, and M0_abus. The program sequencer 24, also coupled to M0_dbus and M0_abus, further includes a Count Index Register (CIR) 50. CIR 50 includes two independent registers: (i) the Count Register (CR); and (ii) the Index Register (IXR). CIR 50 is also illustrated in FIG. 11 where CR 51 is used to specify the vector length for CVA executions, or the number of iterations for PVA executions. The loop cache is coupled to receive data via the M0_dbus. The program sequencer 24 provides address information to M0 14 via the M0_abus. A register file (RF) 26 is also provided, where data is provided from $L_0$ 6 and $L_1$ 8 to RF 26 via L0_dbus and L1_dbus, respectively. The RFP 26, the $L_0$ 6, and the $L_0$ 8 are all coupled to the multiplexors 28, 30 and 32. The multiplexor 28 provides information to primary arithmetic unit (P) 34 via the xbus. In one embodiment, the P 34 is a general purpose functional unit. It can perform all the scalar arithmetic functions defined in the underlying ISA. The multiplexor 30 provides information to P 34 via the ybus.

The result of P 34 is provided to the secondary arithmetic/store unit (S) 36 via the p_bus. The result of P 34 is also provided to multiplexor 40. Besides performing memory store operations, S 36 can also perform some simple arithmetic logic unit (ALU) arithmetic, such as "add," "and," "or," "xor," etc. The multiplexor 32 provides information to latch 38 via the zbus, where information is then provided from latch 38 to multiplexor 41. The output of multiplexor 41 provides information to S 36 via the zs_bus. The data output of S 36 is provided via the s_dbus to multiplexor 40, to multiplexor 41, to M1_dbus, to M0_dbus, and to the Temporary Memory™ 20. The address output of S 36 is also provided via the s_abus to M0_abus, M1_abus and to the Temporary Memory (TM) 20. The output of multiplexor 40 provides information to the RF 26, $L_0$ 6, $L_1$ 8, SSR 42 and multiplexors 28 and 30 via the result_bus.

When executing in a scalar mode, the execution core behaves like a single-issued pipelined machine. It uses the register file RF 26 and P 34 for scalar computations, and $L_0$ 6, $L_1$ 8 and S 36 for memory load/store operations. In particular, the memory addresses for these load/store operations are provided by S 36 to the memory system, including TM 20, M0 14 and M1 16. For memory store operations, data are supplied by the S 36 unit. For memory load operations, data are supplied by the memory system, through $L_0$ 6 and $L_1$ 8, via L0_dbus and L1_dbus respectively, into RF 26 and P 34.

When executing in a vector mode, the vector instruction, i.e. CVA or PVA instruction can optionally enable up to two input data streams, $L_0$ and $L_1$, and one output data stream, S.

When executing in a vector mode, data can be continuously fetched from M0 14, through $L_0$ 6 and L0_dbus, and provided by any of multiple paths to RF 26, P 34, or S 36. A first path is used to stream data to RF 26 via L0_dbus. A second path is used to stream data to P 34 via multiplexor 28; a third path is used to stream data to P 34 via multiplexor 30. A fourth path is used to stream data to S 36 via multiplexor 32, latch 38, and multiplexor 41. For PVA execution, one or more of the first, second, and third paths may be used, depending on the PVA instruction. For CVA execution, one or more of the second, third, and fourth paths may be used, depending on the CVA instruction. Any of these data streams is referred to as input data stream $L_0$.

Similarly, when executing in a vector mode, data can be continuously fetched from M1 16, through $L_1$ 8 and L1_dbus, and provided by any of multiple paths to RF 26, P 34, or S 36. A first path is used to stream data to RF 26 via L1_dbus. A second path is used to stream data to P34 via multiplexor 28; a third path is used to stream data to P 34 via multiplexor 30. A fourth path is used to stream data to S 36 via multiplex or 32, latch 38, and multiplexor 41. For PVA execution, one or more of the first, second, and third paths may be used, depending on the PVA instruction. For CVA execution, one or more of the second, third, and fourth paths may be used, depending on the CVA instruction. Any of these data streams is referred to as input data stream $L_1$.

Also, in vector mode, data can be continusouly stored from S 36 to one of the memory modules M0 14, M1 16 or TM 20. This output data streamed is referred to as the output data stream S.

Figure 5:
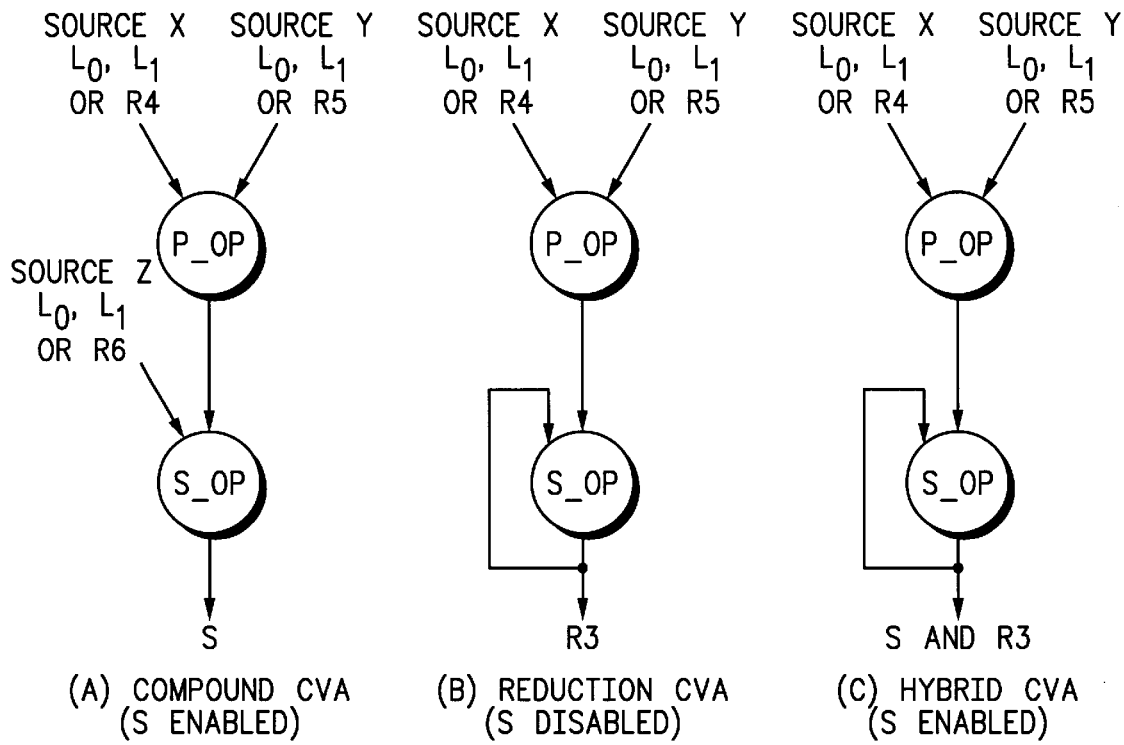
FIG. 5 illustrates in data flow diagram form data dependency graphs for three types of canonical vector arithmetic (CVA) according to one embodiment of the present invention.

The execution core 4 further includes a Stride Size Register (SSR) 42 to specify the stride and the operand size for the $L_0$, $L_1$, and S streams if the corresponding load/store operation is enabled. SSR 42 is coupled to $L_0$ 6, $L_1$ 8, RF 26 and S 36. SSR 42 is further coupled to multiplexor 40 to receive information via the result_bus. A temporary memory storage unit, TM 20 is coupled to S 36, $L_0$ 6 and $L_1$ 8. TM 20 can be used to store temporary vectors, or any data. Vectors stored in TM 20 are not limited to a fixed vector length. Data dependency graphs representing the three types of CVA performed on processing system 2 are illustrated in FIG. 5. In all three types of CVA illustrated in FIG. 5, the first arithmetic performed near the two inputs is called the primary arithmetic, denoted as p_op. This arithmetic is performed at the P 34 of FIG. 3. The second arithmetic performed near the output is called the secondary arithmetic, denoted as s_op. This arithmetic is performed at S 36 of FIG. 3.

FIG. 5 illustrates the relationship between the input data streams $L_0$, and $L_1$, and source operands X, Y, and Z for a CVA for one embodiment of the present invention. The operand X can source from the $L_0$ stream, the $L_1$ stream or from register r4. Operand Y can source from the $L_0$ stream, the $L_1$ stream or from register r5. Operand Z can source from the $L_0$ stream, the $L_1$ stream or from register r6. The X operand and the Y operand are used in the primary arithmetic, p_op. The result of the primary arithmetic is forwarded to the secondary arithmetic, s_op. Depending on the type of CVA, the secondary arithmetic s_op can source from operand Z, or from the output of s_op itself.

A compound CVA, illustrated as (A) in FIG. 5, produces a destination vector as a result of vector computations. The general form of a compound CVA can be expressed as follows:

If source X and source Y are all vectors, then $$R_i=(X_i \; p\_op \; Y_i) \; s\_op \; Z_i, i=0, \ldots, n-1$$

where n denotes the vector length; p_op denotes the primary arithmetic;

s_op denotes the secondary arithmetic; $R_i$ denotes the ith element of the destination vector; and $X_i$, $Y_i$ and $Z_i$ are respectively the ith element of vectors X, Y and Z.

If source X is a scalar constant, x, and source Y is a vector, then $$R_i=(x \; p\_op \; Y_i) \; s\_op \; Z_i, i=0, \ldots, n-1$$

If source X is a vector and source Y is a scalar constant, y, then $$R_i=(X_i p\_op \; y) \; s\_op \; Z_i, i=0, \ldots, n-1$$

Note that the secondary arithmetic, s_op, can also be a "no-op".

For the reduction CVA, illustrated in (B) of FIG. 5, the sources for the X and Y operands are the same as for the compound type, however, no Z operand is used. The output of the secondary arithmetic is fed back as an input to s_op itself. In this case the S stream is disabled. A reduction CVA performs a vector reduction operation, where one or more vectors, as a result of the vector operation, is reduced to a scalar result. The general form of a reduction CVA can be expressed as follows:

If source X and source Y are all vectors, then $$S_0=(X_0 \; p\_op \; Y_0)$$

$$S_i=(X_i \; p\_op \; Y_i) \; s\_op \; S_{i-1}, i=1, \ldots, n-1;$$

$$r=S_{n-1}$$

where $S_i$ denotes the ith partial result; r denotes the scalar result for the vector reduction operations.

If source X is a scalar constant, x, and source Y is a vector, then $$S_0=(x \; p\_op \; Y_0)$$

$$S_i=(x \; p\_op \; Y_i) \; s\_op \; S_{i-1}, i=1, \ldots, n-1;$$

$$r=S_{n-1}$$

If source X is a vector and source Y is a scalar constant, y, then $$S_o=(X_0 \; p\_op \; y)$$

$$S_i=(X_i \; p\_op \; y) \; s\_op \; S_{i-1}, i=1, n-1;$$

$$r=S_{n-1}$$

The feed-back path in conjunction with the secondary arithmetic is responsible for computing and accumulating a partial result; and eventually, producing a final scalar result. An example of such reduction operations is the inner product of two vectors, described by $\Sigma_i(A[i]*B[i])$. In this case, the primary arithmetic is the "multiplication" function and the secondary arithmetic is the accumulative "add" function.

Continuing with FIG. 5, the hybrid CVA, illustrated as (C), allows the same sources for X and Y operands and the feedback for the secondary arithmetic as in the reduction case, however, for the hybrid case the S stream is enabled. A hybrid CVA is identical to a reduction CVA, except that the intermediate partial results are also constantly being written to a destination vector via the S stream. The general form of a hybrid CVA is identical to those for reduction CVA, except that the partial, results, $S_i$, i=0, . . . , n-1, also form a destination vector, R, with $R_i=S_i$, i=0, . . . , n-1. For hybrid CVA, there are two destinations: a scalar destination and a vector destination.

In order to limit the hardware costs, one embodiment of the present invention imposes several restrictions. First, in the compound CVA, the two arithmetic combined can only source up to two distinct vectors. This restriction, however, does not preclude the case where all three source operands are vectors, as long as they source from no more than two distinct vectors. For example, a vector operation described by C[i]=A[i]*A[i]+B[i] has three source vector operands, sourcing from two distinct vectors, A and B. This restriction on number of distinct source vectors reduces the maximum memory bandwidth requirement, from three data fetches per cycle to two data fetches per cycle.

In addition to the above restriction, the secondary arithmetic may be limited to a few simple commutative ALU functions (an ALU function, op, is said to be commutative if x op y=y op x, for all scalar x and y). These functions include add, and, or, xor, etc.

A few examples of CVA are shown in the table below.

TABLE 1

Examples of CVA

| Ex. | Vector Arithmetic | Descriptions | CVA Vector Instructions | Streams Enabled | | |
|---|---|---|---|---|---|---|
| | | | | L0 | L1 | S |
| (i) Compound CVA | | | | | | |
| (a) | C[i] = sA[i] + B[i] | Vector constant multiplication and addition | CVA mul r4, @L0, @P, add @P, @L1, @S; | Y | Y | Y |
| (b) | C[i] = (A[i])$^2$ + B[i] | Element-wise square and add | CVA mul @L0, @L0, @P, add @P, @L1, @S; | Y | Y | Y |
| (c) | C[i] = (A[i])$^2$ | Element-wise square | CVA mul @L0, @L0, @S; | Y | N | Y |
| (d) | C[i] = abs(A[i]) | Element-wise absolute | CVA abs @L0, @S; | Y | N | Y |

TABLE 1-continued

Examples of CVA

| Ex. | Vector Arithmetic | Descriptions | CVA Vector Instructions | Streams Enabled L0 | L1 | S |
|---|---|---|---|---|---|---|
| (e) | $C[i] = A[i]$ | Vector assignment | CVA mov @L0, @S; | Y | N | Y |
| (f) | $C[i] = 0$ | Memory block initialization | CVA mov 0, @S; | N | N | Y |
| (ii) Reduction CVA |
| (g) | $IP = \Sigma_i(A[i]*B[i])$ | Vector inner product | CVA mul @L0, @L1, @P, add r3, @P, r3; | Y | Y | N |
| (h) | $Norm^2 = \Sigma_i(A[i])^2$ | The square of "norm" of vector A | CVA mul @L0, @L0, @P, add r3, @P, r3; | Y | N | N |
| (i) | $Sum = \Sigma_i A[i]$ | Vector reduction through summations | CVA mov @L0, @P, add r3, @P, r3; | Y | N | N |
| (iii) Hybrid CVA |
| (j) | $C[i] = A[i]*B[i]$; $IP = \Sigma_i (A[i]*B[i])$ | Vector multiplication and vector inner product | CVA mul @L0, @L1, @P, add r3, @P, {@S, r3}; | Y | Y | Y |

In each of these examples, the corresponding CVA instruction and the enabling and disabling settings of the $L_0$, $L_1$ and S streams are also detailed. In these CVA instructions, "@" denotes a data stream. In particular, "@L0"denotes the first input data stream $L_0$ from memory; "@L1" denotes the second input data stream $L_1$ from memory; "@P" denotes the intermediate result stream produced by the primary arithmetic, p_op; and "@S" denotes the output data stream S to memory. In one embodiment, all $L_0$, $L_1$ and S streams are constant stride memory operations.

For compound CVA operations, the CVA instruction can specify both the primary and the secondary arithmetic, as illustrated in (a) and (b) in Table 1 above. These two arithmetics are specified in the CVA instructions with a comma separating them: the primary arithmetic is specified first (where in this example, the primary arithmetic is located to the left of the third comma, prior to the word "add"), followed by the secondary arithmetic (where in this example, the secondary arithmetic is located to the right of the third comma, beginning with the word "add"). The instruction is terminated with the ";" symbol. In this case, the "@P" stream appears as a destination in the primary arithmetic; it also appears in the second arithmetic as a source.

For compound CVA operations, the CVA instruction can specify the primary arithmetic but not the secondary arithmetic, as in (c) through (f) in Table 1 above. The secondary arithmetic, s_op, in this case, is a "no-op" and the results produced by the primary arithmetic are stored directly to the memory via "@S" stream. No "@P" stream is specified in these instructions.

For reduction CVA, the CVA instructions specify both the primary and secondary arithmetic, as in (g) through (i) in Table 1 above. In these cases, the "@P" stream appears as a destination in the primary arithmetic; it also appears in the secondary arithmetic as one of the source operands. The destination and the second source operand of the secondary arithmetic is register R3. For reduction CVA, R3 is designated to store the partial results as well as the final scalar result for the reduction operations.

Since the secondary arithmetic is commutative, a shorthand notation can be used to describe a reduction CVA. In this case, the entire secondary arithmetic expression is replaced by the function name for s_op. The CVA instruction for calculating the inner product (Example (g) in Table 1 above), for example, can also be written as:
 CVA mul @L0, @L1, add; //shorthand notation for reduction CVA For hybrid CVA, the instruction syntax is similar to those for reduction CVA, except that the secondary arithmetic has two destinations: an S stream and register R3. They appear on the CVA instruction in the form "{@S, R3}". There is no shorthand notation for hybrid CVA.

Figure 6:
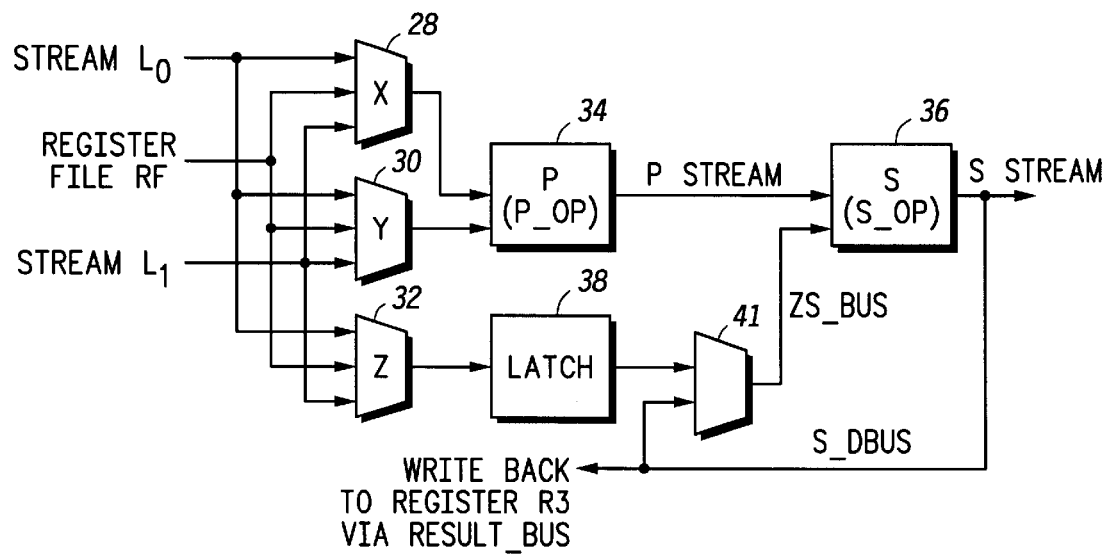
FIG. 6 illustrates in block diagram form configuration of a portion of a processing system as in FIG. 4 for CVA processing according to one embodiment of the present invention.

FIG. 6 illustrates how the three types of CVA (illustrated in FIG. 5) are performed by execution core 4 of FIG. 4 according to one embodiment. The stream $L_0$ is provided from $L_0$ 6; via the L0_dbus, and stream $L_1$ is provided from $L_1$ 8 via the L1_dbus. In FIG. 6, operands X, Y and Z can source from stream $L_0$, stream $L_1$ or a designated register from the RF 26. In particular, the Z operand is supplied to S 36 via multiplexor 32, latch 38, multiplexor 41 and zs_bus. In addition, the s_dbus, multiplexor 41 and the zs_bus are used as a feedback path for accumulating the partial results for reduction and hybrid CVA. For reduction and hybrid CVA, these partial results are also constantly written back to register R3 via the s_dbus and the result_bus.

FIG. 7 shows the format of a CVA instruction, according to one embodiment of the present invention. This instruction includes an enable field where $E_0$, $E_1$ and $E_S$ are the enable bits for the $L_0$, $L_1$ and S streams, respectively. The $V_{x0}/V_{x1}$, $V_{y0}/V_{y1}$ and $V_{z0}/V_{z1}$ bits, respectively, specify how operands X, Y and Z of the CVA operation can source their inputs. In particular, these bits select the sourcing of these operands from stream $L_0$, $L_1$ or from a designated register. The combination of $V_{z0}$, $V_{z1}$ and $E_S$ bits defines the type of CVA to be performed. The p_op and s_op fields specify the opcodes for the primary and the secondary arithmetic to be performed at P 34 and S 36, respectively.

For CVA executions, a special register called Count Register (CR) 51, is used to specify the vector length. One embodiment of CR 51 is illustrated in FIG. 11, as the lower half of a CIR 50 of FIG. 4. The upper half of CIR 50, called the Index Register (IXR) 70, is used for PVA executions only.

In one embodiment, CIR 50 is implemented as a special control register accessed by a software program using the special "move-to-control-register" or "move-from-control-register" instructions. In other embodiments, CR 51 and IXR 70 may be implemented as two separate registers.

For CVA executions, CR 51 must be initialized by the software with the appropriate vector length prior to the CVA executions. During a CVA execution, for each vector element being processed, CR 51 is automatically decremented by one. When CR 51 reaches zero, indicating that the full vector(s) is(are) being processed, the CVA execution will terminate. The machine will then enter a scalar mode, until the next vector instruction, either a CVA or a PVA instruction, is encountered in the instruction stream.

The vector operation: C[i]=sA[i]+B[i], for some scalar s, can be vectorized using a CVA instruction as follows.

Some initialization code

```
// assign L0 to vector A; assign L1 to vector B; assign S to vector C
// initialize R5 with the scalar s
CVA mul @L0, R5, @P, add @P, @L1, @S;
```

This is a compound CVA. In this example, all $L_0$, $L_1$ and S streams are enabled. Stream $L_0$ is assigned to vector A; stream $L_1$ is assigned to vector B and stream S is assigned to vector C. Register R5 is initialized to the scalar s prior to the CVA execution. The primary arithmetic is the "multiply" function and the secondary arithmetic is the "add" function.

Preceding the CVA instruction is some initialization code to assign the $L_0$ stream to vector A, the $L_1$ stream to vector B, and the S stream to vector C. "Assignment" here refers to initializing some specially designated registers to the appropriate starting vector addresses, stride values and element sizes for accessing the vectors A, B and C.

Consider the following program loop example.

EXAMPLE 2

```
L6:
    ldw      R10, (R14)
    addi     R14, 4
    mov      R7, R10
    lsr      R7, R9
    mov      R3, R10
    lsl      R3, R8
    or       R7, R3
    stw      R7, (R13)
    addi     R13, 4
    dec.ne   R4
    bt       L6
```

The vector operation can be described by:

$$C[i]=(lsr(A[i], R9)|lsl(A[i], R8))$$

This loop reads in a vector, A, one element at a time, and performs a logical shift right ("lsr") and a logical shift left ("lsl") operation on each element. An "or" function is performed on the results of the two shift operations and the result is written to a destination vector, C. This loop can be vectorized as follows.

Some initialization code

```
// assign L0 to vector A; assign S to a temporary vector
mov R5, R9
CVA lsr @L0, R5, @S
```

Some initialization code

```
// assign L0 to the temporary vector; assign L1 to vector A.
// assign S to vector C.
mov R5, R8
CVA lsl @L0, R5, @P, or @L1, @P, @S
```

The loop of Example 2 is vectorized by using two compound CVA instructions. The first CVA instruction performs, a "lsr" operation on the source vector A and produces a temporary vector. The second CVA instruction has "lsl" as its primary arithmetic and "or" as its secondary arithmetic. This latter instruction reads in the temporary vector via $L_0$ and performs a "lsl" operation on it. It also reads the original source vector A via $L_1$ and performs an "or" function with the results produced from the primary arithmetic. It then writes back the results to vector C via S. Notice that in this embodiment, the source operand Y for both CVA instructions is always sourced from register R5. Additional "mov" instructions are thus needed prior to the CVA executions to initialize R5.

A CVA execution can also terminate prior to when CR becomes zero. The CVA instruction also has an early termination field containing an $E_T$ bit and a $C_T$ bit, as shown in FIG. 7. The, $E_T$ bit enables or disables the early termination capability for CVA computations. The $C_T$ bit specifies the condition code for this to occur, if the capability is enabled ($E_T$=1). The following example illustrates how this capability can be used for vector computations. In this example, the "c" bit referes to the condition code.

EXAMPLE 3

```
L1:
    addi     R2, 2
    ld.h     R7, (R2)     // load A[i]
    addi     R3, 1
    ld.b     R6, (R3)     // load B[i]
    cmplt    R6, R7       // compare less than: is A[i] > B[i]?
    bt       EXIT         // if so, exit the loop
    dec.ne   R1           // decrement loop index R1
                          // set c bit if r1 not equals zero
    bt       L1           // branch to L1 if c bit is set
EXIT
```

The corresponding high level source code for this loop is shown below.

```
for (i=0; i<n; i++) {
    if(A[i] > B[i]) {break;}
}
```

This loop performs an element-wise compare between vectors A and B. This loop exits as soon as A[i]>B[i], for some i. If no such pair of elements exists, then all elements of vectors A and B will be processed before the loop exits.

If a program loop performs certain arithmetic functions on a fixed length vector(s), and it is possible for the computation to terminate even before the last element(s) of the vector(s) is(are) being processed, then such an operation is called a vector arithmetic with early termination.

In a vector arithmetic with early termination, there are two terminating conditions: (i) when all the elements of a source vector have been processed; (ii) when certain arithmetic condition is met. The latter condition could be met prior to the last vector element being processed, and is usually data dependent and not determined a priori.

The loop shown in Example 3 is a vector arithmetic with early termination. This loop can be vectorized using a CVA construct as follows.

<Some initialization code>
//assign L0 to B, and L1 to A
CVA cmplt.ct=1 @L0, @L1;

In this CVA instruction, both the $L_0$ and $L_1$ streams are enabled, while the S stream is disabled. In particular, the $L_0$ stream is assigned to vector B, while the $L_1$ stream is assigned to vector A. The secondary arithmetic is unspecified (i.e. it is a "no-op"). The instruction has $E_T=1$ and $C_T=1$. The syntax ".ct=x" on the CVA instruction instructs the assembler that $E_T=1$.

The primary arithmetic, "cmplt" or compare-less-than, continuously compares the heads of the $L_0$ and $L_1$ streams. In effect, it is comparing vector A and vector B on an element-wise basis. If B[i]<A[i], for some i, the condition code is set to one, terminating the CVA execution. If no such pair of elements is found, execution continues until the two source vectors are exhausted.

To perform CVA executions with early termination enabled ($E_T=1$), the primary arithmetic p_op (performed at the functional unit P 34 in FIG. 4) is some arithmetic function that can alter the condition code. During the course of the vector executions, if the condition code is set to the pre-specified value, given by the $C_T$ bit, the vector execution will terminate immediately. This termination can occur even before the full vector length is processed, i.e. before CR 51 becomes zero. Note that in the present embodiment, the condition code is a single bit, but alternate embodiments may use any number of bits and/or encodings to represent the condition code.

A PVA instruction is very similar to a DO UNTIL or a DO WHILE instruction in a traditional DSP processor. Like its DSP counterpart, a program loop constructed using a PVA instruction consists of a PVA instruction, followed by a loop body made up of multiple scalar instructions.

Figure 8:
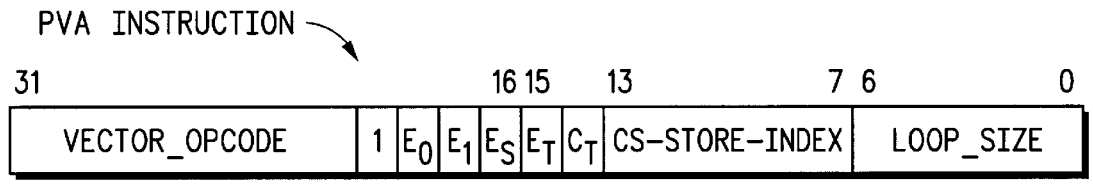
FIG. 8 illustrates in block diagram form the format of a pseudo-vector arithmetic (PVA) instruction, according to one embodiment of the present invention.
Figure 9:
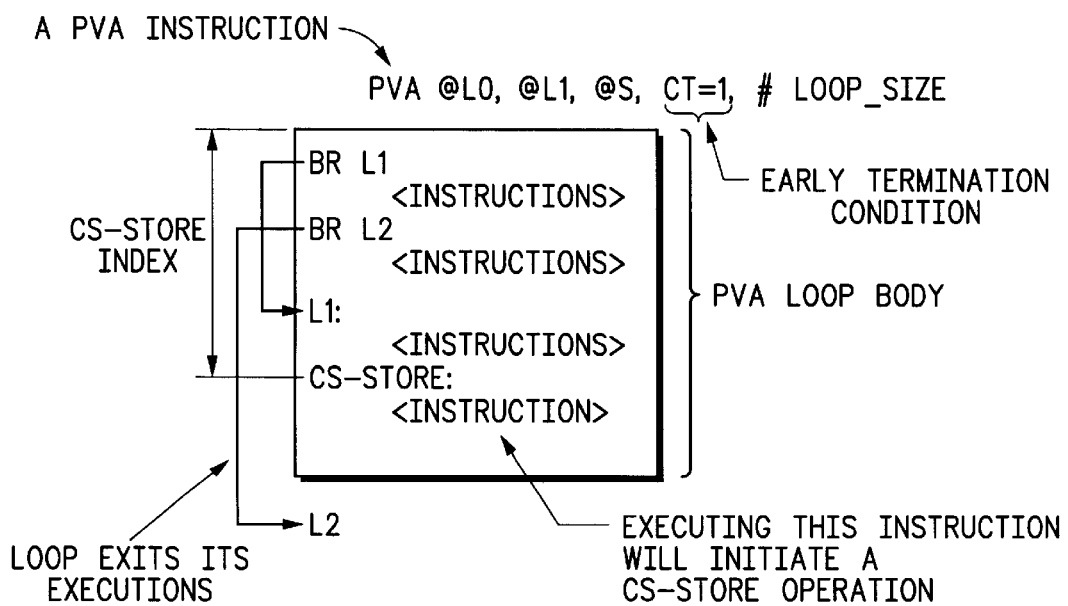
FIG. 9 illustrates in program flow diagram form the structure of a program loop constructed using a PVA instruction according to one embodiment of the present invention.

FIG. 8 shows the format of a PVA instruction. FIG. 9 shows the structure of a program loop constructed using a PVA instruction. When executing in a PVA mode, the execution core 4 also behaves like a single-issued pipeline machine, except the PVA instruction can optionally enable up to two input data streams, $L_0$ and $L_1$, and one output data stream S, to be automatically performed during PVA loop executions. These data streams are constant-stride memory load/store operations. For PVA executions, any or all of the $L_0$, $L_1$ and S streams can be disabled.

Similar to CVA executions, the input streams $L_0$ and $L_1$, respectively, stream in data from memory M0 14 and M1 16, through the load units $L_0$ 6 and $L_1$ 8, into RF 26 and/or P 34. However, for PVA executions, data prefetched via the stream $L_0$ and the stream $L_1$ are written into register R0 and R1 in RF 26, respectively. These data can also be feed-forwarded directly into the P 34. For PVA executions, multiplexor 32, latch 38 and multiplexor 41 are not used.

Referring to FIG. 8, a PVA instruction includes an enable field having $E_0$, $E_1$ and $E_s$ which are enable bits for data streams $L_0$, $L_1$ and S, respectively. A PVA instruction also has an early termination field having an $E_T$ bit and a CT bit. Similar to those in a CVA instruction, the $E_T$ bit enables or disables the early termination capability for PVA executions. The $C_T$ bit specifies the condition code for this to occur, if the capability is enabled ($E_T=1$).

The Loop_size field in the PVA instruction specifies the size of the loop body, in number of scalar instructions. The cs-store-index field in the PVA instruction specifies the instruction within the loop body that, when executed, will automatically initiate a constant stride store (cs-store) operation. The data for this cs-store operation is the data written back by this instruction. In one embodiment, the index value for the first instruction in a PVA loop is one, the index value for the second instruction is two, and so on. The index value for the last instruction in the PVA loop is Loop_size. The index values in this embodiment are instruction positions relative to the PVA instruction. Other instruction indexing schemes are also possible.

In a PVA program loop, conditional and unconditional branches are allowed within the loop body. If a branch within the loop body is taken, and the target of the branch is still within the loop body, the PVA execution will continue. If a branch within the loop body is taken, and the target of the branch is outside the loop body, the PVA execution will automatically terminate.

The CR 51, illustrated in FIG. 11 as the lower half of CIR 50, is also used for PVA executions. In particular, it is used to specify the number of loop iterations to be performed. Similar to its CVA counterpart, the CR 51 needs to be initialized by the software with the appropriate iteration count prior to its execution. During a PVA execution, CR 51 is automatically decremented by one for each iteration executed. When CR 51 reaches zero, PVA execution will terminate. The machine will then enter a scalar mode, until the next vector instruction is encountered in the instruction stream.

A PVA execution can terminate via one of three mechanisms: (i) when CR 51 reaches zero; (ii) when the $E_T$ and $C_T$ bits in the PVA instruction indicate an early termination condition; or, (iii) when a branch is taken within the loop body and the target of the branch lies outside the loop. All three exit conditions can co-exist in a single program loop. That is, a loop can terminate via one of the above three terminating mechanisms, based on run time conditions. Terminating mechanisms (ii) and (iii) are collectively referred to as early termination for PVA executions.

The program loop shown in Example 3 can be vectorized using a PVA construct, using the early termination capability (ii) described above.

<Some initialization code>

```
// assign L0 to B, and L1 to A
PVA     @L0, @L1, ct = 1, #1;    // PVA instruction
cmplt   R0, R1;                   // loop body with one instruction
```

The symbols "@L0" and "@L1" are both specified on the PVA instruction. This signifies to the assembler that both $L_0$ and $L_1$ streams are enabled. The S stream is disabled, since the "cs-store" label does not appear in the loop body. In this instruction, $E_T=1$ and $C_T=1$. Setting $E_T=1$ enables the early termination capability (ii) described above. The syntax "ct= x" on the, PVA instruction instructs the assembler that $E_T=1$.

The size of the PVA program loop is one instruction, as specified by the "#1" notation on the PVA instruction. This loop contains a single scalar instruction, "cmplt", which continuously reads from registers R0 and R1, and compares the two values.

For PVA executions, reading from R0 (or R1) within the loop body will automatically dequeue a data item from the $L_0$ (or $L_1$) input stream. The dequeuing of a data item from the $L_0$ (or $L_1$) queue will cause a constant stride load (cs-load) operation to be automatically performed, in order to fill up the empty slot left behind by the dequeuing action. Thus, continuously reading from register R0 (or R1) within the loop body will trigger a continuous stream of data to be fetched from the memory M0 14 (or M1 16) and loaded into register R0 (or R1). R0 (or R1) can be read multiple times within a single loop iteration.

For PVA executions, when the $L_0$ (or $L_1$) stream is enabled, R0 (or R1) becomes a read-only register; writing to this register will be ignored by the hardware.

In effect, the "cmplt" instruction in the above loop body compares vectors A and B on an element-wise basis. In this example, if the content of R0 is less then the content of R1 (i.e. B[i]<A[i]), the condition code is set to one, equal to the pre-specified value $C_T=1$, causing the PVA loop execution to terminate immediately (since $E_T=1$). This termination can occur even before CR 51 reaches zero.

Alternatively, the program loop shown in Example 3 can also be vectorized using a PVA construct, as follows. This example illustrates how a PVA loop can exit early using the early terminating mechanism (iii) described earlier.

<Some initialization code>

```
// assign L0 to B, and L1 to A
PVA     @L0, @L1, #2;   // PVA instruction
cmplt   R0, R1;         // part of PVA loop
bt EXIT                 // part of PVA loop
EXIT
```

In this alternative, $E_T=0$ in the, PVA instruction. There are two instructions in the loop body: "cmplt" and "bt". When the first instruction sets the condition code, as a result of the compare operations between vectors A and B, the second instruction ("bt EXIT") is taken. Since the target of this branch lies outside the loop body, the PVA execution terminates immediately. Otherwise, if the condition code is not set and the branch instruction "bt" is not taken, the execution will continue with the first instruction of the next iteration (the "cmplt" instruction in this case).

The first version of the PVA vectorized loop illustrated earlier (using terminating mechanism (ii)) is more efficient than the second version of the PVA vectorized loop illustrated above (using terminating mechanism (iii)). The former has only one scalar instruction in the loop body, while the latter has two scalar instructions in the loop body.

The "exit-by-conditional-branch" alternative is typically used by a program loop with conditional executions within the loop body that also utilize the condition code.

Notice that in the original program loop illustrated in Example 3, eight instructions per iteration are requested by the execution core during loop executions. After the loop is vectorized using a PVA construct, only two to three instructions per iteration are requested by the execution core during loop executions.

Figure 23:
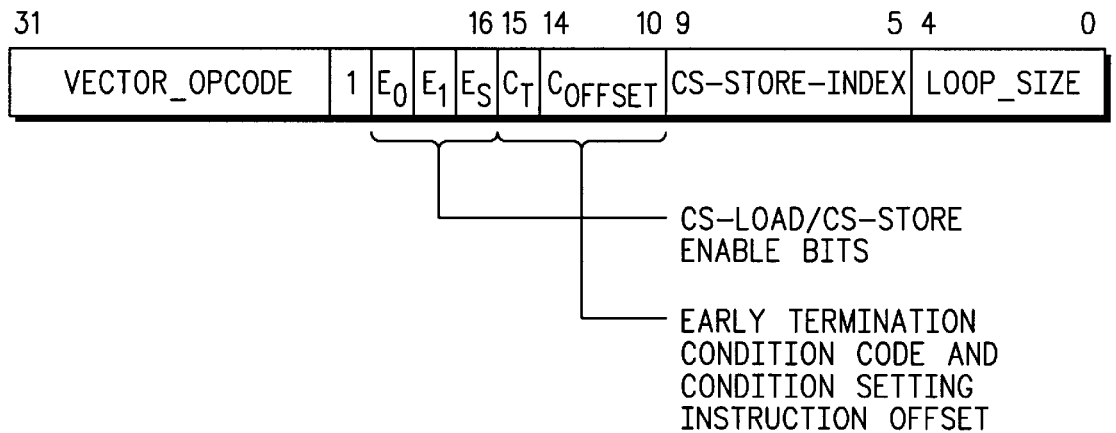
FIG. 23 illustrates in block diagram form the format of a PVA instruction, according to an alternate embodiment of the present invention.
Figure 24:
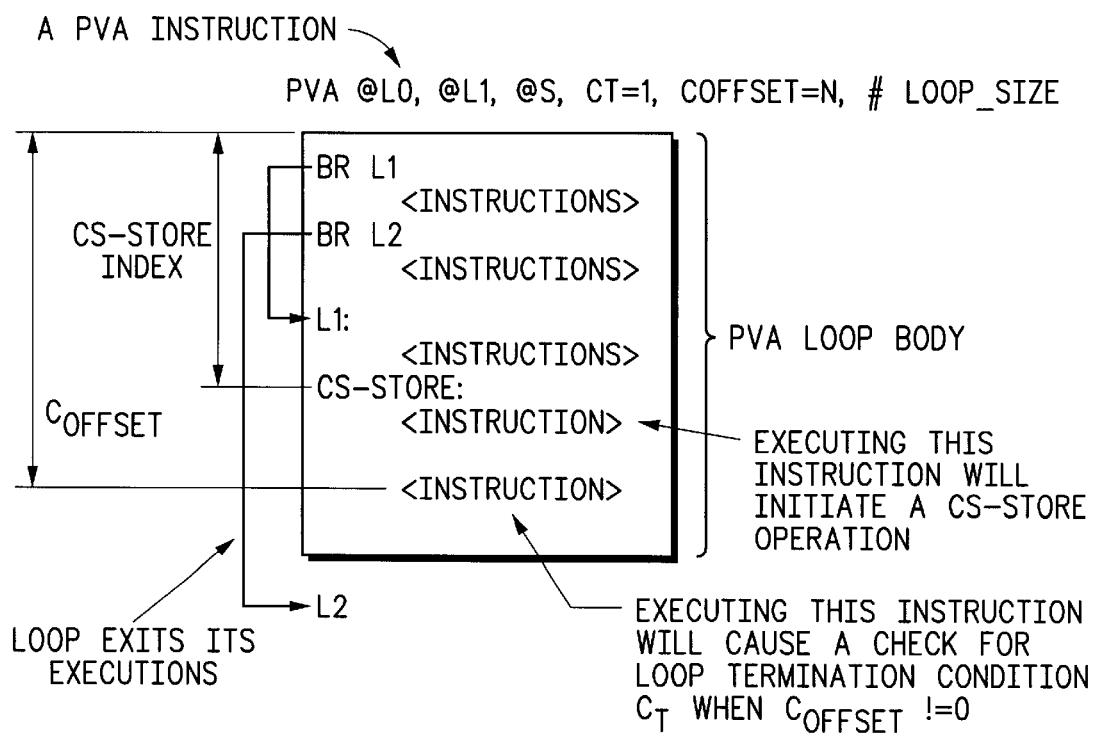
FIG. 24 illustrates in program flow diagram form the structure of a program loop constructed using a PVA instruction according to an alternate embodiment of the present invention.

Alternately, to effect an early termination, the PVA instruction may specify the offset of a condition setting instruction which can cause a loop to exit early, as illustrated in FIG. 23. The structure of a program loop constructed using the PVA instruction of FIG. 23 is shown in FIG. 24. In FIG. 23, a non-zero $C_{offset}$ field indicates that the early termination capability is enabled (similar to setting $E_T=1$ in the format of FIG. 8). This field specifies the offset(in number of instructions from the PVA instruction) of a condition setting instruction. When the condition code (or the c bit) is set to the value specified by the $C_T$ field in the PVA instruction, as a result of execution of the condition setting instruction, the PVA executions terminate immediately. An example is shown below.

Some initialization code //assign A[i] to L0; assign B[i] to L1.

```
PVA @L0, @L1, #5, C_T = 1, C_offset = 4
cmplt R0, R1        //part of loop body
bt SKIP             //part of loop body
sub R3, R4          //part of loop body
SKIP
cmpnei R3, #2       //part of loop body, check R3
add R5, R3          //part of loop body
EXIT
```

In this alternative, $C_{offset}=4$ in the PVA instruction. There are five instructions in the loop body ("cmplt", "bt", "sub", "cmpnei", and "add"). The cmplt instruction compares the values in R0 and R1 and sets the condition code (or the c bit). The "bt" instruction checks the value of the resulting c bit, and if set, branches around the "sub" instruction. The fourth instruction in the loop is a compare instruction which is comparing the result of the subtract instruction (in register R3) to see if it is not equal to the value "2". If the result of the comparison is true, the c bit will be set to '1', and since the the $C_T$ field of the: PVA instruction is set to '1' also, the PVA executions terminate immediately. Otherwise, the execution will continue with the next instruction "add". Following the add instruction, execution continues with the next loop iteration ("cmplt"). Notice that the $C_{offset}$ field of the PVA instruction indicates that the "cmpnei" instruction (offset of 4 in the loop relative to the PVA instruction) is used to control loop termination, and that the c bit may be affected by other instructions (in this case, the "cmplt" instruction) in the loop without affecting loop termination. This capability is useful when multiple conditions must be tested within the loop without affecting loop termination.

The following example will be used to illustrate how the cs-store operations via the S stream can be performed for PVA executions.

EXAMPLE 4

```
        mov     R4, 4
        mov     R8, 8
        mov     R6, 16
L1:
        ld.w    R7, (R3)    // load A[i]
        addi    R3, 4
        mov     R2, R8
        cmplt   R6, R7      // is A[i] > 16?
        movt    R2, R4      // conditional move:
                            // R2 = (A[i] > 16)? R4:R8;
        st.w    R2, (R10)   // store result to C[i]
        addi    R10, 4
        dec.ne  R5          // decrement loop index R5
                            // set c bit if R5 not equals zero
        bt      L1          // branch to L1 if c bit is set
```

The high level source code for the above loop is shown below.

```
for (i=0; i<n; i++) {
    if(A[i]>16) C[i]=4; else C[i] = 8;
}
```

This loop can be vectorized using a PVA construct, as follows.
<Some initialization code>

```
// assign L0 to vector A; assign S to vector C.
    mov     R4, 4
    mov     R8, 8
    mov     R6, 16
    PVA     @L0, @S, #3;      // PVA instruction
    mov     R2, R8
    cmplt   R6, R0            // is A[i] > 16?
cs-store:
    movt    R2, R4            // conditional move:
                              // R2 = (A[i]>16)? R4:R8;
                              // cs-store performed here
```

In this loop, the $L_0$ and S streams are enabled, but not the $L_1$ stream. The PVA loop size is three instructions. On each iteration, the "cmplt" instruction reads R0 (or an element A[i]) and compares it against a constant value 16 that is stored in R6. The "movt" instruction conditionally moves R4 to R2, if the c bit (or the condition code) is set. Otherwise, it moves R2 to R2 with the value unchanged.

The "movt" instruction is located at the "cs-store" label within the loop body. A cs-store operation via the S stream is automatically initiated whenever this "movt" instruction is executed. The data used for this cs-store operation is the same data written back by the "movt" instruction. When executing this PVA loop, the results produced by the "movt" instruction are driven onto the p_bus by P 34, and constantly written back to RF 26 via multiplexor 40 and result_bus. The S 36 captures these results on the p_bus and performs the cs-store operations to the memory system using these captured data.

In this example, the store operation associated with the "movt" instruction is specified, in the assembly code, using the program label "cs-store" inside the loop body. In the machine code (or the assembled binary code), however, no such store operation is encoded into the "movt" instruction. Instead, the store operation is implicitly specified in the PVA instruction that is used to construct the loop. In this case, the PVA instruction has its $E_S=1$, and its "cs-store-index" field pointing to the "movt" instruction. We will refer to this type of store operation as an "implict store" operation. The instruction within the loop body that can trigger the store operation ("movt" in this example) is called the implicit store instruction.

In the above embodiment, there is only one "cs-store-index" field in the PVA instruction, thus only one "cs-store" label is allowed in the loop body. As a result, only one implicit store operation is allowed in each iteration. In alternate embodiments, multiple implicit store operations can be performed by using a special mask register. In one such alternate embodiment, the mask register can be a 16-bit register, with each bit in this register corresponds to a scalar instruction in the loop body. Each bit in this register enables or disables the cs-store operation for the corresponding scalar instruction. Thus up to 16 instructions in the loop body can initiate cs-store operations in each iteration. The software initializes this mask register prior to a PVA execution. During a PVA execution, when an instruction writes back a result, and its corresponding bit in the mask register is set, a cs-store operation is initiated, using the data written back by the instruction. Hardware support is needed for specifying the 16 cs-store data addresses, strides, and operand sizes.

Figure 25:
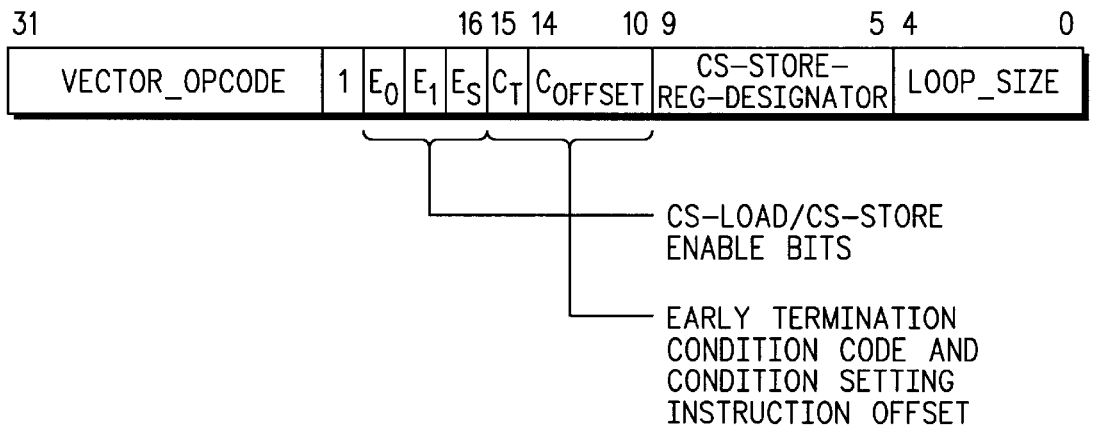
FIG. 25 illustrates in block diagram form the format of a PVA instruction, according to an alternate embodiment of the present invention.
Figure 26:
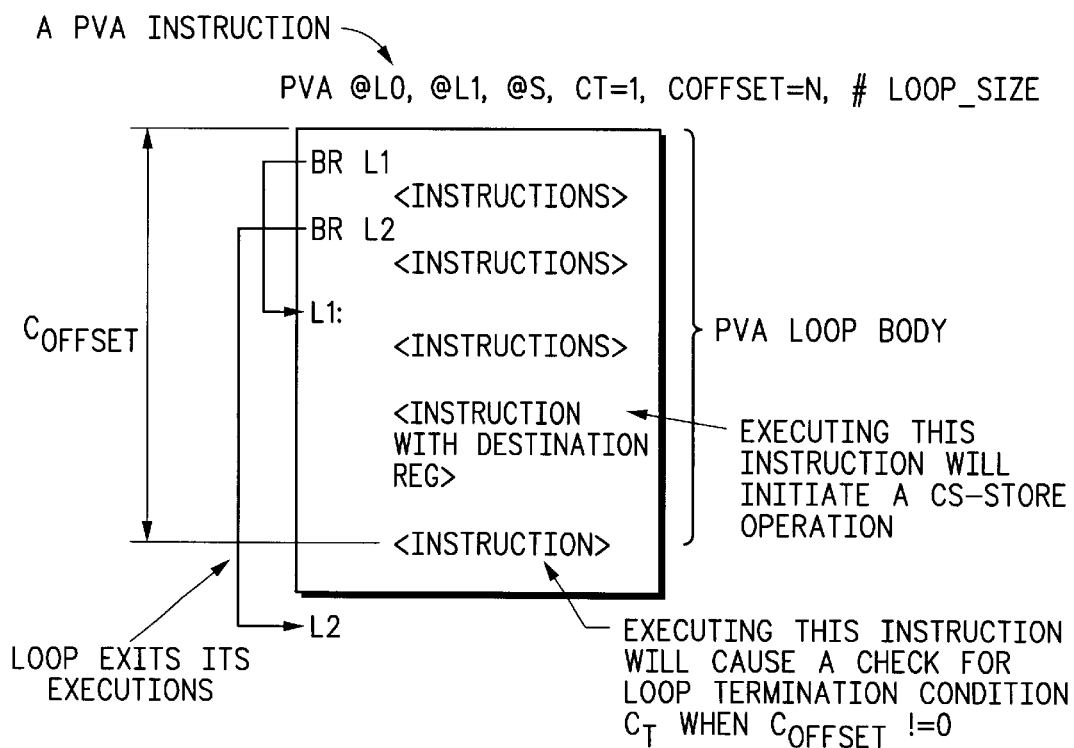
FIG. 26 illustrates in program flow diagram form the structure of a program loop constructed using a PVA instruction according to an alternate embodiment of the present invention.

In another embodiment utilizing an implicit store operation, a cs-store-reg-designator field (also referred to as a register field) may be specified in the PVA instruction rather than the cs-store-index. For example, FIG. 25 illustrates one embodiment of a PVA instruction having a cs-store-reg-designator field, and FIG. 26 illustrates a program loop constructed using the PVA instruction format of FIG. 25. This cs-store-reg-designator field defines the implicit store operation as a function of the destination register of any instruction inside the loop body. For example, if the cs-store-reg-designator field indicates register 3, then any instruction having register 3 as its destination would invoke the implicit store. An example instruction might be "add R3, R5" which is in the format "instruction destination, source." This add instruction uses register 3 as the destination register and therefore would correspond to the implicit store operation. If more than one instruction within the loop body were to use register 3 as the destination register, then multiple instructions may initiate the implicit store operations. However, an instruction such as "cmpnei R3,#2" may not correspond to an implicit store operation since, in this case, R3 is not being used as a destination register. The "cmpnei" instruction (as well as others) does not generate a result value to be written into a destination register, and the format is specifying a pair of source values in this case. Furthermore, alternate embodiments may allow multiple registers to be defined in the PVA instruction to allow for more implicit stores.

In yet another embodiment, a PVA instruction can also incorporate an early continuation capability. The format of a PVA instruction with this capability is shown in FIG. 20. There are two additional bits in this PVA instruction, the $E_C$ and the $C_C$ bits, within an early continuation field. The $E_C$ bit enables or disables an early continuation capability, while the $C_C$ bit specifies the value of the condition code in which this early continuation will occur, if this capability is enabled.

The following high level code illustrates how this early continuation capability can be used to skip the execution of the remaining part of a program loop.

```
for (i=0; i<n; i++){
    if(A[i] < s) continue;
    <more code>
}
```

In this example, elements from vector A are compared with a scalar, s. If A[i]<s, for some i, then the remaining part of the program loop, denoted as "<more code>" above, is skipped and the execution continues with the beginning of next iteration. This is in contrast with the "early termination capability" described earlier where the execution of the loop is terminated immediately when a pre-specified condition is met.

This loop can be vectorized as follows.
<Some initialization code>
//assign L0 to A; initialize R1 with scalar s.

| PVA   | @L0, cc=1, #Loop_size; | // PVA instruction |
| cmplt | R0, R1;                | // A[i] < s? |
| <more code> |                  | // The rest of the loop body |

In this PVA instruction, $E_C=1$ and $C_C=1$. The syntax "cc=x" on the PVA instruction instructs the assembler that $E_C=1$. Whenever the "cmplt" instruction sets the condition code to one, as a result of its compare operations between A[i] and s, the execution will continue immediately with the next iteration, skipping the executions of "<more code>".

In a PVA instruction that enables both early termination and early continuation capabilities ($E_T=E_C=1$), an instruction within the loop body can alter the condition code, thereby ending the execution of the current iteration. If the condition code is set to the value specified by the $C_T$ bit, the loop execution will terminate completely. If the condition code is set to the value specified by the $C_C$ bit, the loop execution will continue with the next iteration. If the condition code is set to the value specified by both the $C_T$ and the $C_C$ bits (they both specify the same value for the condition code), the loop execution will terminate. That is, the early termination capability, in this embodiment, supercedes the early continuation capability. In other embodiments, the early continuation capability could supercede the the early termination capability. Although not shown, early continuation capability may also be provided in a similar manner shown in FIG. 23 for early termination. A $C_{offset-c}$ field and $C_C$ bit may be added to the instruction format or may replace the $C_{offset}$ and $C_T$ specifiers. The $C_{offset-c}$ field and $C_C$ bit would then specify the offset in instructions from the PVA instruction of a condition setting instruction, and a condition value to be used for effecting an early continuation of the loop when the specified instruction generates a condition code which matches the $C_C$ bit setting in the PVA instruction.

The PVA construct, in general, is capable of removing certain execution overhead associated with: (i) loop control mechanism; (ii) input data streaming via the cs-load; and (iii) output data streaming via the cs-store. The PVA instruction may also include any combination of fields described above, as appropriate, depending on the needs of the system. For example, alternate embodiments may use different fields and methods to perform an implicit store operation, as described above.

Figure 10:
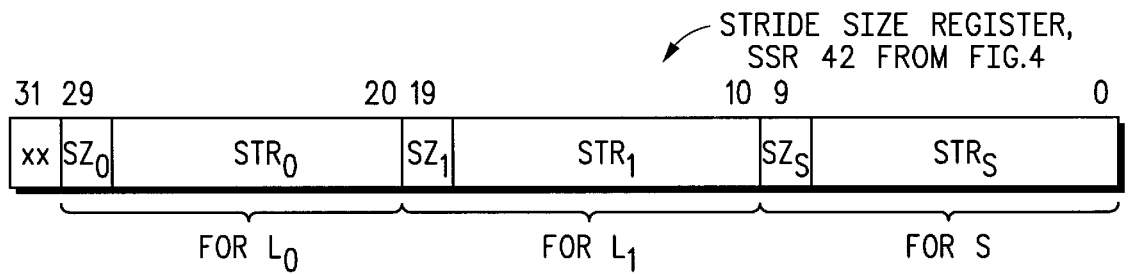
FIG. 10 illustrates in block diagram form the format of the Stride Size Register, SSR, according to one embodiment of the present invention.

FIG. 10 shows one embodiment of the SSR 42 for specifying the stride values and operand sizes for data streams $L_0$, $L_1$ and S. This register is used for both CVA and PVA executions. In this embodiment, the register is partitioned into three parts, one for each of the three data streams $L_0$, $L_1$ and S. The stride fields, $STR_0$, $STR_1$ and $STR_S$ are 9-bit wide. The size fields, $SZ_0$, $SZ_1$, and $SZ_s$ are 2-bit wide, each specifying a byte, a halfword, or a full word.

Consider the following example which implements the inner product of two vectors: $\Sigma_i (A[i]*B[i])$. This operation can be performed using a CVA instruction as follows. In this example, $SSR[STR_0]$ denotes the $STR_0$ field of the SSR register, and so on.

Initialize CR to the vector length.
Initialize $SSR[STR_0]$ to stride value for vector A.
Initialize $SSR[STR_1]$ to stride value for vector B.
Initialize R0 to the starting address for vector A.
Initialize R1 to the starting address for vector B.
CVA mul @L0, @L1, add;

In this example, $L_0$ and $L_1$ are enabled and S is disabled, and thus this is a reduction CVA. The primary arithmetic for this reduction operation is the "mul" function, and the secondary arithmetic is the "add" function. During the CVA execution, the partial results are continuously written back to register R3. When the vector computation is completed, the final result, i.e. the inner product, will be implicitly stored in R3. The CVA instruction, in this example, will have the following settings: $V_{x1}/V_{x0}=01$, $V_{y1}/V_{y0}=10$, $V_{z1}=V_{z0}=11$, $E_S=0$, $E_T=0$, $C_T$="don't care".

In this example, if the vector execution is interrupted, register R3 will contain the intermediate partial result of the inner product computations. Upon returning from the interrupt, computations will continue from where it left off, using the content of register R3 as the initial partial result.

Another example implements the vector arithmetic: C[i]=sA[i], for all i.

Initialize CR to the vector length.
Initialize $SSR[STR_0]$ to stride value for vector A.
Initialize $SSR[STR_S]$ to stride value for vector C.
Initialize R0 to the starting load address for vector A.
Initialize R2 to the starting store address for vector C.
Initialize R5 to S.
CVA mul @L0, R5, @S;

This is a compound CVA. The second arithmetic is a "no-op". In this case, the $L_0$ stream and the S stream are enabled, but not the $L_1$ stream. Prior to the vector executions, R5 was initialized with the scalar constant, s. The CVA instruction, in this example, will have the following settings: $V_{x1}/V_{x0}=01$, $V_{y1}/V_{y0}=00$, $V_{z0}/V_{z1}=00$, $E_S=1$, $E_T=0$, $C_T$="don't care".

Figure 12:
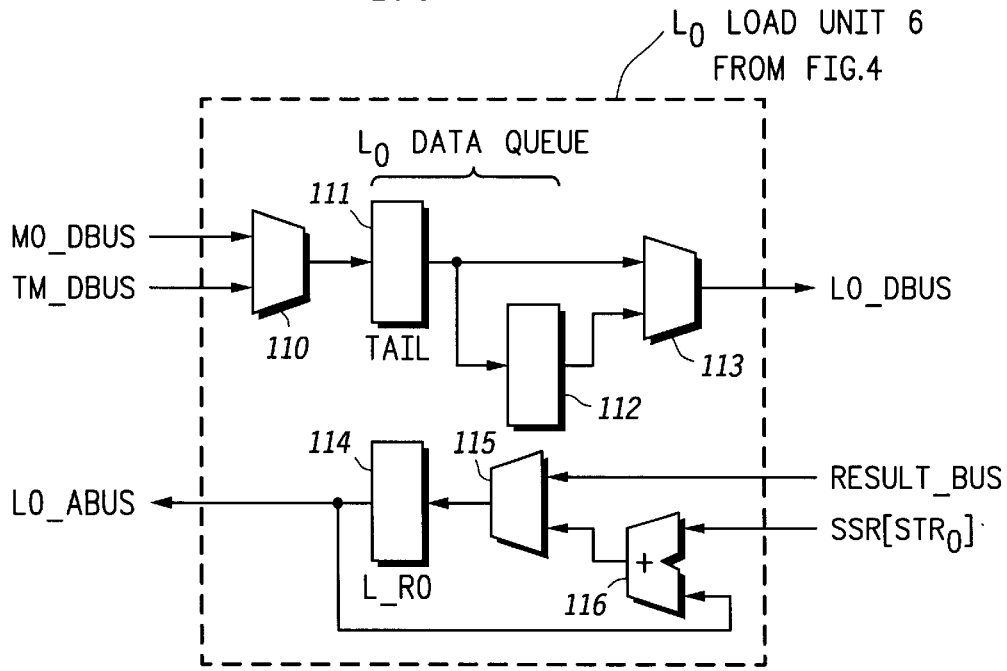
FIG. 12 illustrates in block diagram form one embodiment of the load unit $L_0$ according to one embodiment of the present invention.
Figure 13:
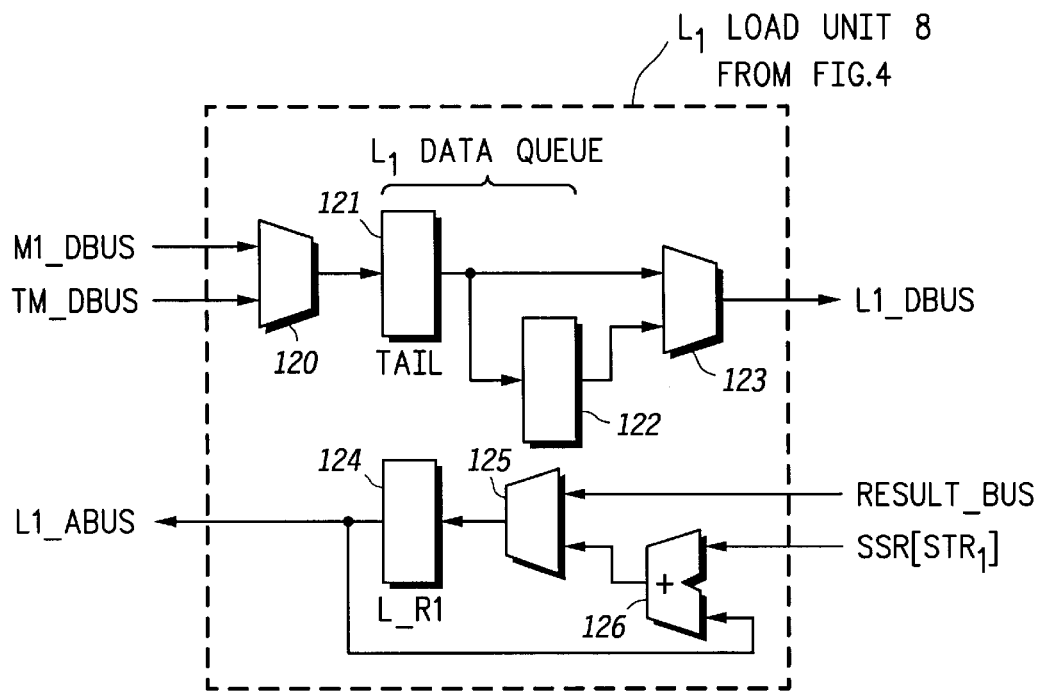
FIG. 13 illustrates in block diagram form one embodiment of the load unit $L_1$ according to one embodiment of the present invention.
Figure 14:
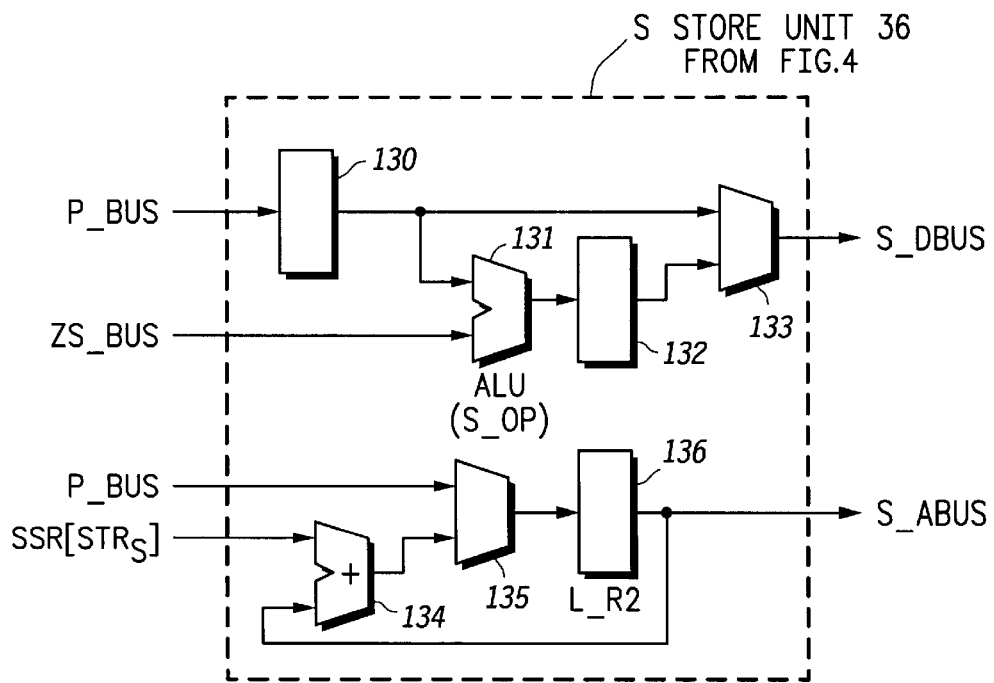
FIG. 14 illustrates in block diagram form one embodiment of the store unit S according to one embodiment of the present invention.

FIGS. 12–14 illustrate one possible implementation of $L_0$ 6, $L_1$ 8, and S 36, respectively. Each has a local copy of register R0, R1 and R2, respectively. They are denoted as L_R0 114, L_R1 124 and L_R2 136.

During scalar executions, the $L_0$ 6 (or $L_1$ 8) unit constantly snoops the result_bus for any write back activities to register R0 (or R1), and updates its local copy of the register, L_R0 114 (or L_R1 124). Likewise, the S 36 constantly snoops the p_bus for any write back activities to register R2 and updates its local copy of the register, L_R2 136 (see FIG. 14).

During a CVA or a PVA execution, the contents of these local registers are appropriately used as load or store addresses for the memory blocks. These registers are constantly updated by the hardware by adding the appropriate stride-values, when the corresponding data stream is enabled. That is, L_R0 114, L_R1 124 and L_R2 136 are, respectively, summed with the amount specified by SSR $[STR_0]$, $SSR[STR_1]$ and $SSR[STR_S]$, for each cs-load or cs-store operation performed.

When a vector instruction (CVA or PVA instruction) is first decoded with fits $E_0$ (or $E_1$) bit set, a cs-load is immediately initiated using the L_R0 114 (or L_R1 124) as the first load address. Subsequently, L_R0 114 (or L_R1 124) is updated once for each data prefetched from the memory.

In the embodiment illustrated in FIGS. 12 and 13, the data queues in the load units $L_0$ 6 and $L_1$ 8 are only two-deep. The inputs to $L_0$ 6 include M0_dbus and TM_dbus. These two inputs are provided to the multiplexor 110. The output of multiplexor 110 is provided to the tail of the data queue 111. The tail of the data queue 111 provides data to the multiplexor 113, and to the second entry of the data queue 112.

This second entry 112 also provides data to multiplexor 113. Data is provided to L0_dbus from the multiplexor 113.

In the load unit $L_0$ 6, data from M0_dbus and TM_dbus can be provided to the L0_dbus via multiplexor 110, through the tail entry 111 and multiplexor 113, by-passing the second data entry 112. Data can also be provided to the L0_dbus from the second entry 112, and through multiplexor 113.

Continuing with FIG. 12, an adder 116 receives stride information from SSR 42, SSR[$STR_0$], and load address information from L_R0 114. The output of adder 116 is coupled to multiplexor 115. The result bus is also coupled to multiplexor 115. The output of multiplexor 115 is coupled to L_R0 114, which is coupled to the L0_abus. During vector execution, the amount specified by SSR[$STR_0$] is added to L_R0 114, for each cs-load operation performed via the stream $L_0$. The multiplexor 115 and L_R0 114 allow load unit $L_0$ 6 to snoop the result_bus for any write back to register R0. During scalar execution L_R0 114 is maintained with the same value as register R0 in RF 26. Similar operations and connectivities hold true for the load unit $L_1$ 8 illustrated in FIG. 13.

Referring to FIG. 14, in the store unit S 36, the p_bus provides data to latch 130. The output of this latch and zs_bus provide data to an ALU 131. The ALU 131 then provides data to latch 132, which in turn, provides data to multiplexor 133. The multiplexor 133 takes data from latch 130 and from latch 132, and provides data to s_dbus.

Data may also be provided from p_bus, through latch 130 and multiplexor 133, and to s_dbus. This path by-passes the ALU 131 computation in the store unit S 36. Data may also be provided from the output of the ALU 131, through latch 132 and multiplexor 133, to s_dbus. This path takes the result of the ALU 131 and puts it onto the s_dbus.

In vector arithmetic, most data loaded from the memory via the constant-stride loads are temporaries only, in the sense that they are consumed in a single iteration, and are never used again. If a vector arithmetic is allowed to be interrupted, then all the constant-stride load/store addresses associated with the vector executions need to be saved to allow the load/store operations to resume after returning from the interrupt.

Storing all the prefetched temporaries from the memory as well as the load/store addresses using some architectural visible storage spaces, such as the general purpose register file or control registers, could be an inefficient use of these valuable resources. The present invention implements a register overlay to address this problem. In this approach, upon entering a PVA execution mode, a portion of the architectural visible register file is "overlaid" with a new set of registers. When a register is being overlaid, it has two instances: (i) an overlaid instance; and (i) a temporary instance. When in the PVA mode, only its temporary instance is visible to a programmer, but not its overlaid instance. Conversely, when the execution exits the PVA mode and enters a scalar mode, the overlaid instance becomes visible again and the temporary instance cease to exist.

Figure 15:
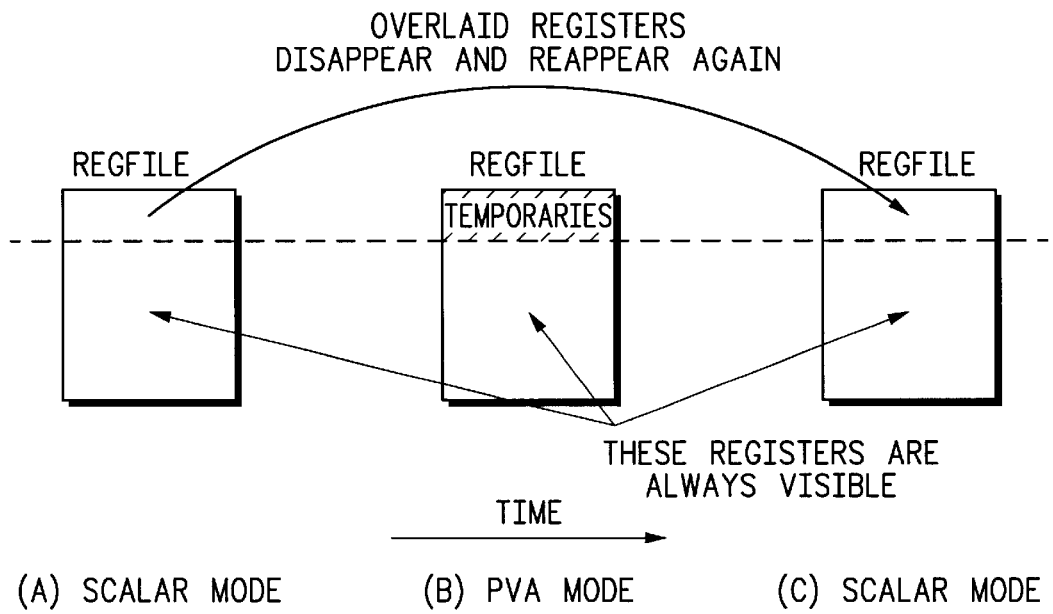
FIG. 15 illustrates in block diagram form a register file having overlaid registers during one mode of operation according to one embodiment of the present invention.

FIG. 15 illustrates the visibility of the overlaid registers over a sequence of three execution modes: scalar, PVA and scalar. In one embodiment, registers R0 and R1 are designated as the set of registers that could be overlaid during PVA executions. They are shown in Table 2 below. The overlaid instances of these registers are used to store the corresponding cs-load load addresses. The temporary instances of these registers are used to store the data prefetched from the memory via the cs-load $L_0$ and $L_1$.

TABLE 2

Register Allocation and Accessibility

| Registers | Overlaid Instance (only visible in scalar mode) | | Temporary Instance (only visible in PVA mode) | |
|---|---|---|---|---|
| | Contents | | Contents | Operation |
| R0 | Load address for $L_0$ | | Prefetched data for $L_0$ | Read Only |
| R1 | Load address for $L_1$ | | Prefetched data for $L_1$ | Read Only |

The temporary instances of R0 and R1 are denoted as T_R0 and T_R1, respectively. The overlaid instances of R0 and $R_1$ are denoted as O_R0 and O_R1, respectively.

The T_R0 and T_R1 are read-only registers. Writing to these temporary registers within a loop body are ignored in hardware. These temporary registers are only defined during the PVA executions. When a PVA loop exits its execution, the data contained in these temporary registers are lost. Access to such a register, at that point, will retrieve the overlaid instance of the register, which is the load address for the last cs-load operation performed.

Also, when a PVA execution is interrupted, T_R0 and T_R1 are not saved as part of the context. Upon returning from the interrupt, the cs-load operations that prefetched the data into T_R0 and T_R1 will be re-initialized, using the load addresses stored in the O_R0 and O_R1. Registers T_R0 and T_R1 will be re-initialized before the normal PVA executions can resume.

Figure 16:
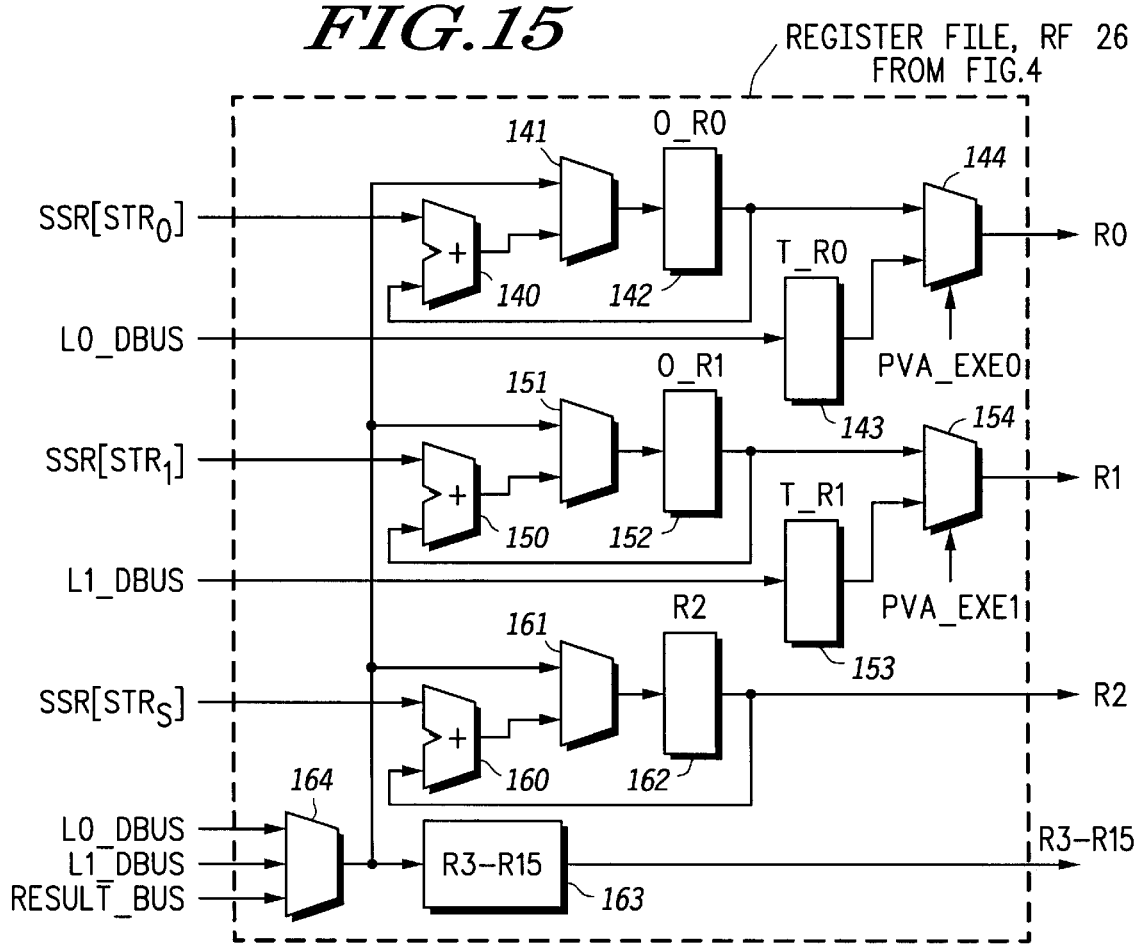
FIG. 16 illustrates in block diagram form a register file with temporary and overlaid registers according to one embodiment of the present invention.

FIG. 16 illustrates one embodiment of the register file RF 26 of FIG. 4. RF 26 contains, among other registers, O_R0 142, T_R0 143, O_R1 152 and T_R1 153. In RF 26, the registers O_R0 142, O_R1 152 and R2 162 are updated using adders 140, 150 and 160, respectively.

The value in the register O_R0 142 is fed to multiplexor 144. It is also fed-back into an input of adder 140. The other input of adder 140 is coupled to SSR[$STR_0$]. The output of adder 140 is provided as an input to multiplexor 141. The output of multiplexor 141 is coupled to the input of O_R0 142. The output of multiplexor 164 is provided as another input to multiplexor 141. T_R0 143 takes its input from L0_dbus and provides its output to another input of multiplexor 144. The output of multiplexor 144 is provided as output R0 of RF 26. By using adder 140, multiplexor 141 and O_R0 142, O_R0 142 can be incremented by the amount specified by SSR[$STR_0$] in each cycle.

Using the same mechanism, in each cycle, O_R1 152 and R2 162 can be updated by similar hardware configuration by adding the stride values SSR[$STR_1$] and SSR[$STR_S$], respectively.

During PVA execution, the updates of O_R0 142 and T_R0 143 occur at the same time when the corresponding cs-load operation is committed to the RF 26. Likewise, the updates of O_R1 152 and T_R1 153 occur at the same time when the corresponding cs-load operation is committed to the RF 26. The updates of R2 162 occur at the same time when the corresponding cs-store is committed to the memory. At any given point in time, T_R0 143 (or T_R1 153) contains the data prefetched from the memory, with an address stored in O_R0 142 (or O_R1 152). This consistency is maintained across instruction boundaries during PVA executions. Note that the temporary registers, T_R0 144 and T_R1 154, are not needed for CVA or scalar executions.

Figure 17:
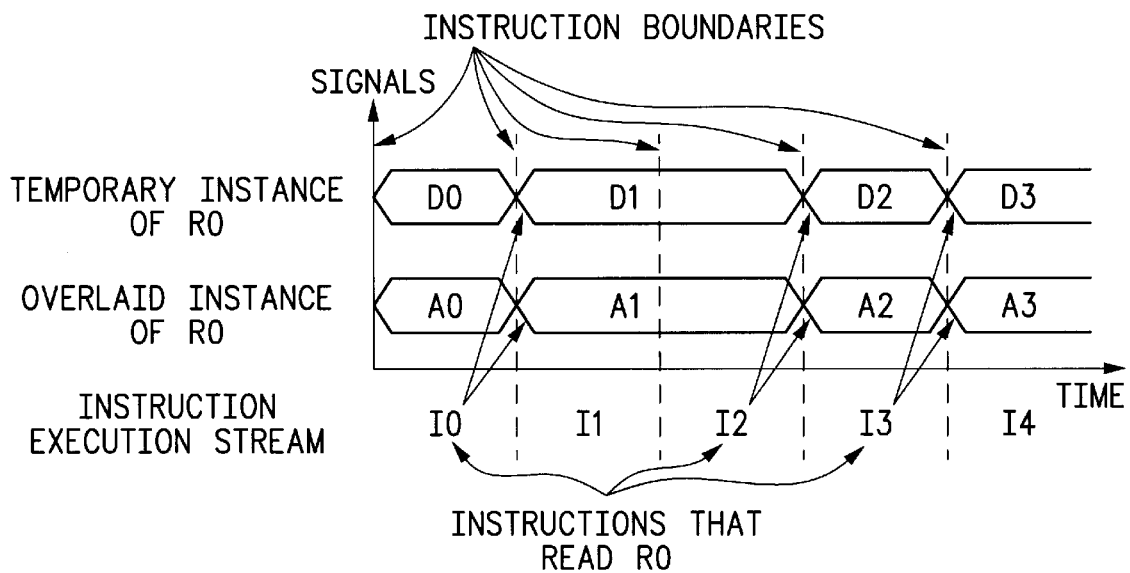
FIG. 17 illustrates in timing diagram form the correspondence of the temporary and overlaid registers according to one embodiment of the present invention.

The consistency of temporary and overlaid instances, during PVA executions, is illustrated in FIG. 17. Illustrated is a five-instruction execution sequence. The horizontal axis represents time, while the temporary and overlaid instances of register R0 are each represented on the vertical axis. Instruction boundaries are indicated by vertical dashed lines. In this example, the data, streamed in via the stream $L_0$, are D0, D1, D2, D3, . . . and A0, A1, A2, A3, . . . are the corresponding load addresses. Among these five instructions, I0, I2 and I3 are instructions that read register R0. A read from R0 causes O_R0 142 and T_R0 143 to be updated simultaneously with a new "address-data" pair at the beginning of next instruction boundary, as shown in FIG. 17. Instruction I1 is an instruction that does not read R0, and therefore, O_R0 142 and T_R0 143 are not updated on the next instruction boundary. The registers O_R0 142 and T_R0 143 are updated on the next instruction boundary following a read of register R0. Until then, they maintain their last updated values. Registers O_R1 152 and T_R1 153 are updated by the hardware in a similar manner.

Returning to FIG. 16, a read of R0 from RF 26 is selected between T_R0 143 and O_R0 142. This selection is controlled by multiplexor 144 using a control signal called PVA_exe0. This signal is asserted when the machine is executing in a PVA mode and the stream $L_0$ is enabled. The reading of R0 from RF 26, in this case, will output the content of T_R0 143. At other times when PVA_exe0 is not asserted, reading from R0 will output the content of O_R0 142. A similar control mechanism exists for reading R1 from RF 26 during a PVA execution.

The register R2 162 is not overlaid. Like registers R3 to R15 in RF 26, R2 has a single instance. It is, however, updated in a similar manner to registers O_R0 142 and O_R1 152 during a PVA execution with the S stream enabled.

For scalar execution, a memory load is performed by fetching data from memory block M0 14 through $L_0$ 6 onto L0_dbus, or from M1 16 through $L_1$ 8 onto $L_1$ dbus, and subsequently by writing into any register in RF 26. Therefore a path is needed to write the data from L0_dbus or L1_dbus into any register in RF 26. This path is provided by multiplexor 164 in RF 26, as illustrated in FIG. 16. Multiplexor 164 takes its inputs from L0_dbus, L1_dbus and the result_bus, and provides its output to multiplexor 141, multiplexor 151, multiplexor 161 and a register array 163. The register array 163 implements architectural register R3 through R 15. Through multiplexor 164, L0_dbus and L1_dbus can write to any register in RF 26, except T_R0 143 and T_R1 153. In the present embodiment, the temporary registers, T_R0 143 and T_R1 153, are not available during scalar execution.

Prior to any vector execution (CVA or PVA execution), certain registers need to be properly initialized. These special register contain all the necessary information for the hardware to carry out the proper vector executions. Table 3 details these special registers.

TABLE 3

Special Registers For Vector Execution

| Registers | Notations | Register Contents |
|---|---|---|
| Stride and Size Register | SSR | Stride values and operand sizes for $L_0$, $L_1$ and $S^1$ |
| Count Index Register | CIR | CR: number of iterations to be excuted; IXR: "local PC" for PVA loop |

TABLE 3-continued

Special Registers For Vector Execution

| Registers | Notations | Register Contents |
|---|---|---|
| General purpose register, R0 | O_R0 | Load address for $L_0^{1,2}$ |
| General purpose register, R1 | O_R1 | Load address for $L_1^{1,2}$ |
| General purpose register, R2 | R2 | Store address for $S^1$ |
| General purpose register, R3 | R3 | Partial and final results for reduction or hybrid CVA[1] |
| General purpose register, R4 | R4 | Source for operand $X^1$ |
| General purpose register, R5 | R5 | Source for operand $Y^1$ |
| General purpose register, R6 | R6 | Source for operand $Z^1$ |

[1]If applicable.
[2]These are overlaid instances only.

In the present embodiment, only SSR 42 and CIR 50 are special control registers. All others are general purpose registers. Depending on the vector operation, these registers may or may not carry special meaning during the vector execution. R2, for example, has special meaning when the S stream is enabled during the vector execution, where the special meaning refers to storing the latest cs-store address for the S stream.

Table 3 only includes overlaid instances of R0 and R1. Upon an interrupt, or an exception, SSR 42 and CIR 50 are saved by the hardware. Additional hardware support is needed to save these special control registers. Since registers R0 through R6 are general purpose registers, they are automatically saved by the hardware. Only the temporary registers, T_R0 143 and T_R1 153, (not shown in Table 3) are not saved by the hardware.

Upon returning from an interrupt, the following information will need to be restored to the machine prior to resuming the normal execution. The contents of O_R0 142, O_R1 152 and R2 162 will need to be copied from RF 26 to L_R0 114 (in $L_0$ 6), L_R1 124 (in $L_1$ 8) and L_R2 136 (in S 36), respectively. The latter three local registers are illustrated in FIGS. 12–14, respectively.

In addition, for reduction and hybrid CVA, the intermediate partial result stored in R3 will need to be restored back into the latch 130 in S 36, and further onto the s_dbus through multiplexor 133 (see FIG. 14). Restoring this partial result involves reading R3 from RF 26, forwarding the data through P 34, onto the p_bus, and further onto the s_dbus through S 36 (see FIG. 4).

As illustrated in FIG. 4, there are three independent on-chip memory blocks: M0 14, M1 16, and TM 20. There is also a loop cache 22 for storing program loop instructions during PVA executions. M0 14 and M1 16 are the main on-chip memories. M0 14 is used to store instructions and data. M1 16 is used to store data only. TM 20 is also used to store data only, and in particular, is used to store temporary vectors during vector executions.

In the memory system of one embodiment as illustrated FIG. 4, the load unit $L_0$ 6 has read access to M0 14 and TM 20; the load unit $L_1$ 8 has read access to M1 16 and TM 20; S 36 has write access to all M0 14, M1 16 and TM 20. M0 14 and M1 16 are single ported memories, while TM 20 has one read port and one write port. The contents, accessibilities and the number of read and write ports of these memory blocks are shown in Table 4. Alternate embodiments may implement other memory configurations which allow scalar and vector operations.

TABLE 4

| Memory Block | Contents | Memory Specifics | | | Number of Read/Write Ports | Arbitrate Between Streams |
|---|---|---|---|---|---|---|
| | | Data Streams | | | | |
| | | L0 | L1 | S | | |
| M0 | Instructions and data | Read | — | Write | 1 (read or write) | $L_0$ vs. S |
| M1 | Data | — | Read | Write | 1 (read or write) | $L_1$ vs. S |
| TM | Data (temporary vector) | Read | Read | Write | 2 (one read and one write) | $L_0$ vs. $L_1$ |

To perform a compound or hybrid CVA with streams $L_0$, $L_1$ and S enabled, the memory system will need to support two data reads and one data write per cycle in order to maintain a peak throughput rate of one result per cycle. There is no instruction request during a CVA execution. This is because once a CVA instruction is decoded and executed, no further instruction is needed for the rest of the CVA execution. In addition to the two data reads and one data write, PVA executions may also require one instruction fetch in each cycle.

In each cycle, the memory system illustrated in FIG. 4 can support up to two data reads and one data write, through M0 14, M1 16 and TM 20; it can also support one instruction fetch in the same cycle, through the use of loop cache 22. The three memory blocks M0 14, M1 16 and TM 20 can be accessed by referencing certain predefined memory space, i.e. they are memory mapped blocks.

According to one embodiment, the TM 20 illustrated in FIG. 4 is a small RAM memory used for storing temporary vectors during vector executions. It may also be used for storing frequently used constant vectors, such as the coefficient vectors in digital filtering. TM 20 is an extension of vector registers in the traditional vector machines for holding temporary vectors. Like those of traditional vector machines, the optimizing compilers attempt to operate on these temporary vectors as much as possible prior to writing them back to the memory. TM 20 helps reduce the memory bandwidth pressure on M0 14 and M1 16. It also helps reduce the power consumption of these larger memory blocks.

Accesses to TM 20 are made by referencing the appropriate memory space, instead of an explicit reference specified in the vector instructions, such as vector register numbers. In particular, these accesses are made by setting up the streams $L_0$, $L_1$ and S.

When constructing, allocating and utilizing these temporary vectors, compilers have more flexibility in organizing the temporary storage space. For example, if TM 20, or some other similar temporary memory, is able to store a vector of n elements, it can also be organized as a storage space for m vectors, each with a length of n/m elements. The TM 20 can also be organized as a storage space for multiple vectors with different length. The compilers, in this case, try to manage the vector allocations to minimize fragmentations within TM 20.

In the following example, TM 20 is assumed to be 512 bytes, direct-mapped, with one read port and one write port. TM 20 can be utilized, in this example, to speedup the vector executions.

Again, consider the loop shown in Example 2. Recall that this loop is performing: C[i]=(lsr(A[i], R9)|lsl(A[i], R8). The vectorized code is shown below.

```
Some initialization code
// assign L0 to vector A; assign S to a temporary vector in TM
mov R5, R9
CVA lsr @L0, R5, @S
Some initialization code
//assign L0 to vector A; assign L1 to the temporary vector in TM
//assign S to vector C.
mov R5, R8
CVA lsl @L0, R5, #P, or @L1, @P, @S
```

In this example, a temporary vector is created and allocated in TM 20. The destination of the first CVA instruction and one of the source operands of the second CVA instruction access the temporary vector through TM 20. The first CVA instruction sources vector A from M0 14, via the $L_0$ stream, and writes the temporary vector to TM 20, via the S stream. The second CVA instruction sources vector A again from M0 14, via the $L_0$ stream, and sources the temporary vector from TM 20, via the $L_1$ stream. It also writes the result vector to M1 16, via the S stream.

In this example, the second CVA instruction uses three data streams, two inputs and one output. No memory conflict arises in these vector executions. Using M0 14 and M1 16 alone would have caused memory conflicts. Without TM 20, the second CVA instruction would have taken two cycles to produce each result element.

When the size of a vector being processed is larger than the size of TM 20, the vector operations break down, under software control, into multiple vector operations, with each operating on vectors of a length available for storage in TM 20. In this sense, the use of TM 20 is analogous to "strip-mining" for vector registers. Unlike the fixed length vector registers, however, the compilers, in this case, have the flexibility to trade-off between the number of temporary vectors it can allocate and utilize, and the number of strip-mined iterations.

As another example, we will strip-mine and vectorize the above loop, assuming that the vector length is not known at compile time. The element size is known to be a word (4 bytes). Since each vector element is four bytes long, and TM 20 is 512 bytes, a vector with length greater than 128 elements will require some strip-mining code to avoid overflowing the TM 20.

In this example, there are only two CVA instructions and one temporary vector involved, and it is possible to have the entire TM 20 dedicated to storing a temporary vector with length of 128 or less. The following shows the strip-mined code, in C-style language, with an unknown vector length, n.

```
low = 1;
VL = (n mod 128);          // find the odd size piece first
for (J=0; j<n/128; j++) {
    for (i=low; i<low+VL-1; i++) { // runs for length VL
        C[i] = (lsr(A[i],R9) | lsl(A[i],R8)); //main CVA operations
    }
    low = low + VL;
    VL = 128;              // reset VL to 128 after the first
                           // odd size piece
}
```

The TM 20 may also be used to reduce power consumption, while maintaining the highest possible performance level, as in the example of performing the following vector reduction operation:

$$\Sigma_i ((A[i]*B[i]+C[i])*A[i]*B[i]*D[i]),$$

for some independent vectors A, B, C and D. Assume that vectors A and C reside in M0 14; vectors B and D reside in M1 16.

An optimum solution, in terms of execution time, using three temporary vectors and four CVA instructions (3 compound CVA and 1 reduction CVA), is shown below.
  (1) T1[i]=A[i]*B[i];.
  (2) T2[i]=T1[i]+C[i];
  (3) T3[i]=T1[i]*D[i];
  (4) Reduction result=$\Sigma_i$ (T2[i]*T3[i]).

As vectors A and B reside in M0 14 and M1 16, vector T1 must be allocated in TM 20. Thus vector T3 must be in M0 14, given that vector D resides in M1 16. Since vector C resides in M0 14, vector T2 can be in M1 16 or TM 20. Table 5 shows two possible solutions for allocating the temporary vectors T1 and T2.

TABLE 5

Temporary Memory Allocation

| Temporary Vectors | Solutions (I) | | | Solution (II) | | |
|---|---|---|---|---|---|---|
| | M0 | M1 | TM | M0 | M1 | TM |
| T1 | | | X | | | X |
| T2 | | X | | | | X |
| T3 | X | | | X | | |

Both of these solutions incur no memory conflict. Both solutions achieve the optimal performance level on this machine. Solution (II) in Table 5, however, provides a lower power solution since it allocates vector T2 to TM 20. A drawback of Solution (II) is that it requires the temporary vectors T1 and T2 to reside in TM 20 simultaneously. If TM 20 is not big enough to hold both vectors, then Solution (I) is the only viable solution. If TM 20 is too small for even a single vector, then Solution (I) will need to be strip-mined.

All of the vector executions of one embodiment of the present invention are interruptible. An interrupt can cause a temporary suspension of a vector execution prior to the completion of vector computations. In addition to the scalar context, additional vector context will need to be saved so that the vector execution can properly resume upon returning from the interrupt. On an interrupt, some of these vector contexts are saved and some discarded. The vector contexts that are saved include all the registers shown in Table 3. These registers include SSR 42, CIR 50, overlaid instances O_R0 142 and O_R1 152, R2 162 and other registers in RF 26, i.e. all registers in RF 26 excluding T_R0 143 and T_R1 153.

For CVA executions, operations on each vector element is "atomic," in the sense that if the result of the operation associated with a vector element is not written back when an interrupt occurs, all the intermediate results will be discarded. All operations performed on this element, or elements, will have to be repeated upon returning from interrupt. For reduction or hybrid CVA executions, the partial result produced in each cycle is continuously written back into register R3 in RF 26. On an interrupt, as the partial result is already in RF 26, it is, therefore, automatically saved. This eliminates any additional wasted time to save the partial result. When returning from interrupt, however, the content of register R3 in RF 26 will be restored back into the s_dbus before normal CVA executions can resume.

For PVA executions, all the intermediate results produced in the loop body are stored in the register file, RF 26. Thus no additional time is wasted to save the intermediate results. The temporary registers T_R0 143 and T_R1 153 are not saved as part of the vector context. Upon returning from interrupt, the cs-load operations that fetched these temporaries are reinitialized, if the input stream is enabled. Temporary registers T_R0 143 and T_R1 153 are then updated accordingly before the normal PVA executions can resume. The hardware, in this case, assumes that the memory locations have not been altered during the course of servicing the interrupt.

Figure 18:
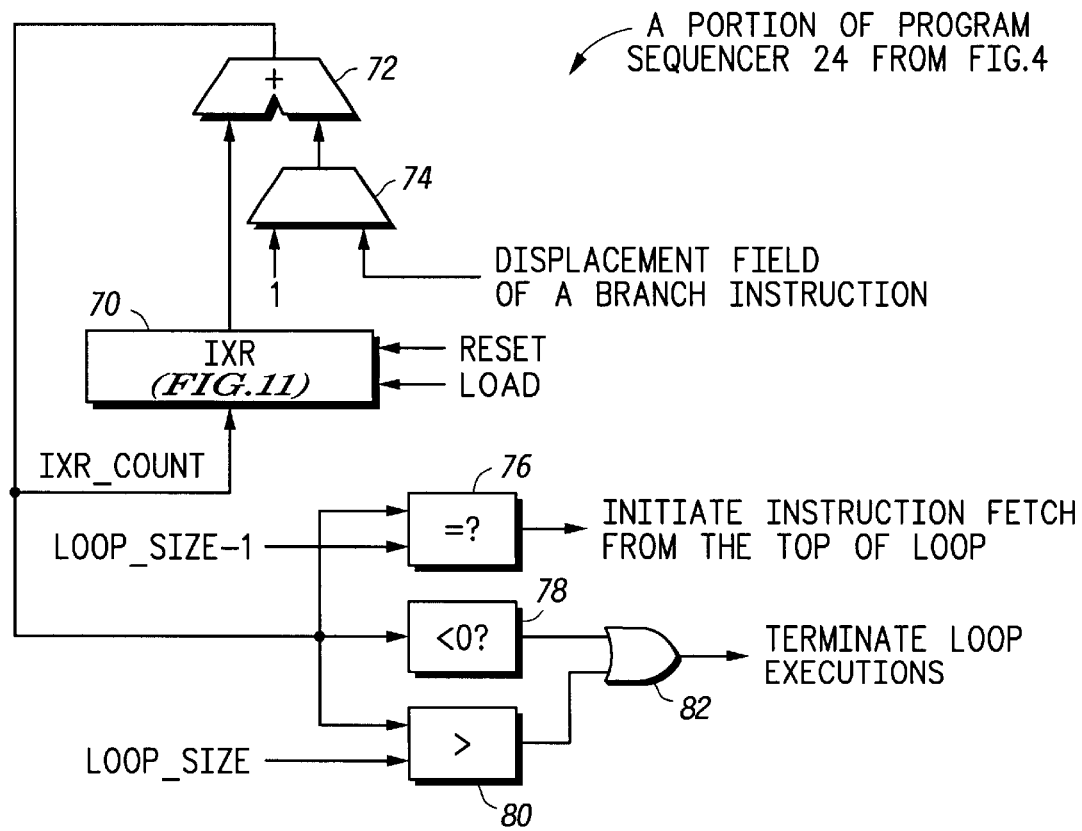
FIG. 18 illustrates in block diagram form a counter to manage program loop executions according to one embodiment of the present invention.

FIG. 18 illustrates a portion of the program sequencer 24 of FIG. 4. To monitor the loop execution and the target of a branch, a counter based scheme may be used. When a PVA instruction is encountered, the Loop_size specified in the instruction is captured by the hardware, such as the program sequencer 24 of FIG. 4. In addition, IXR 70 (see FIG. 11) is used to keep track of which instruction within the loop body is currently being executed. One embodiment of implementation of the IXR is illustrated in FIG. 18. The IXR 70 behaves like a local program counter (PC) within the loop body. When the first instruction in the loop is being executed, IXR 70 is set to one. For each instruction sequentially executed, IXR 70 is incremented by one. When the last instruction in the loop is being executed, IXR 70 is equal to Loop_size. When IXR 70 is equal to (Loop_size−1), the instruction fetch is directed to the first instruction of the loop. If the last instruction is a sequential instruction or the instruction does not cause a change-of-control flow, where a target lies outside the loop body, the execution will transfer back to the beginning of the loop and IXR 70 is reset to one.

The IXR 70 receives an IXR_count value that is the output of adder 72. The value stored in IXR 70 is provided as one input to adder 72, and the other input is from multiplexor 74. One input to multiplexor 74 is a one, and the other is the displacement field of a branch instruction. In this way, either the adder 72 outputs the next sequential value or a branch displacement value. The IXR 70 also receives a reset signal that resets IXR 70 to one, and a load signal to accept the next IXR_count.

When a branch is taken during a PVA execution (either in a forward or a backward direction), the branch displacement field of the branch instruction is added to IXR 70. This addition operation is performed by multiplexor 74 and adder 72. The multiplexor 74, in this case, selects the displacement field of the branch instruction to adder 72. If the sum of this register value and the branch displacement is negative or greater than the loop size, indicating that the branch target lies outside the loop body, the PVA loop execution will terminate.

Continuing with FIG. 18, the IXR_count value is also provided as input to blocks 76, 78 and 80. The IXR_count is constantly compared with zero, Loop_size and Loop_size−1. If (IXR_count<0) or (IXR_count>Loop_size), it indicates that an instruction is executing outside the loop body. If (IXR_count<0), as determined in block 78, the output of block 78 is asserted as input to "or" gate 82. Similarly, if (IXR_count>Loop_size), as determined in block 80, the output of block 80 is asserted to "or" gate 82. On either condition, the output of "or" gate 82 terminates loop executions. Also, if (IXR_count==Loop_size−1), as determined in block 76, an instruction fetch from the top of the loop is initiated.

Towards the end of the last iteration of a PVA execution, if the last instruction in the loop is a taken conditional branch with target address outside the loop body, a cycle penalty will be incurred for wrongfully fetching and executing the first instruction in the loop. In this case, the result of executing this instruction will be squashed, i.e. the result will be discarded and not written back. A new instruction fetch using the branch target will be initiated.

When resuming a PVA execution from an interrupt, the necessary loop control information must first be recovered. This can be done in multiple ways. In one embodiment, when a PVA instruction is first encountered, a copy of the PC (the address of the PVA instruction) is saved in a temporary hardware location. Upon an interrupt, this hardware copy is saved as the PC. When returning from the interrupt, the PC is first used to fetch the PVA instruction to recover all the loop control information, including the Loop_size, cs-store-index, etc. After this information is recovered, the content of IXR 70 is added to the PC. The PVA loop execution will then continue with the instruction pointed to by the new PC.

In another embodiment, when a PVA execution is interrupted, the PC points to the instruction within the loop body whose execution was interrupted. This PC is saved as part of the execution context. Upon returning from the interrupt, the content of IXR 72 is subtracted from the PC to obtain the PVA instruction address. The PVA instruction is then fetched to recover all the loop control information, including cs-store-index, Loop_size, etc.

In PVA executions, execution of the instruction located at the "cs-store" label, and its associated cs-store operation is an "atomic" operation. Consider again the vectorized PVA loop taken from Example 4.

<Some initialization code>

| <Some initialization code> | | |
|---|---|---|
| // assign L0 to vector A; assign S to C[i]. | | |
| mov | R4, 4 | |
| mov | R8, 8 | |
| mov | R6, 16 | |
| PVA | @L0, #S, #4; | // PVA instruction |
| mov | R2, R8 | |
| cmplt | R6, R0 | // is A[i] > 16? |
| cs-store: | | |
| movt | R2, R4 | // R2 = (A[i]>16)? R4:R8; |
| | | // cs-store performed here |

The "movt" instruction and the associated cs-store operation are "atomic". If a cs-store does not complete due to an interrupt, then the "movt" instruction is also considered "not executed". Upon returning from the interrupt, executions will resume starting at the "movt" instruction.

For each of the vectorized examples provided above, a compiler evaluates the original code, which may be written a high-level language programming language, or in assembly code. The compiler analyzes the code to look for loops or other constructs which are applicable to CVA and/or PVA instructions. The process flow for compilation according to one embodiment of the present invention is illustrated in FIG. 19.

Figure 19:
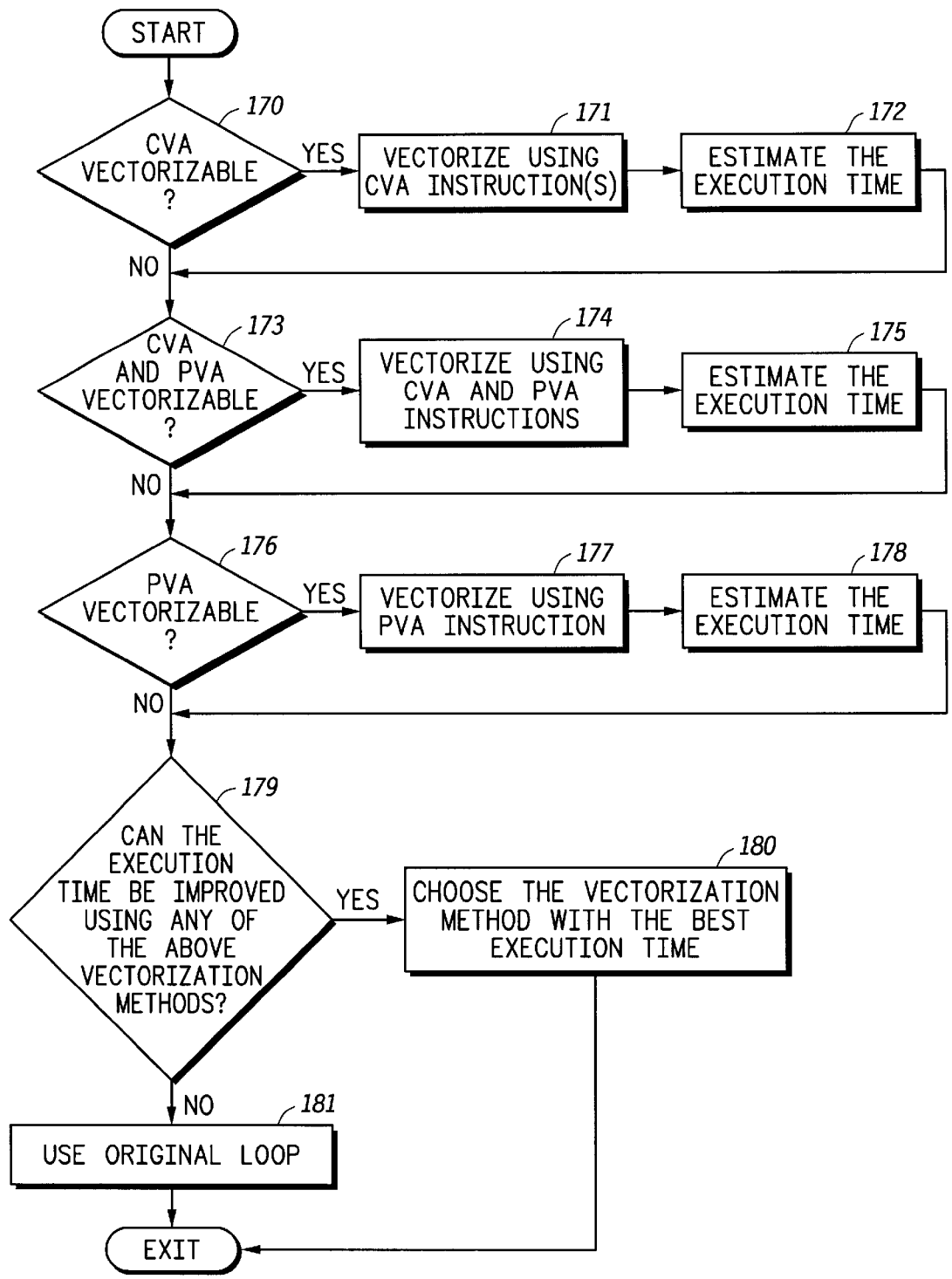
FIG. 19 illustrates in flow diagram form a decision flow for processing computer program code according to one embodiment of the present invention.

As illustrated in FIG. 19, the process first decides if the loop, or section of code, is vectorizable using CVA execution at decision diamond 170, and if so the process vectorizes the code using at least one CVA instruction at block 171. The process then estimates the execution time of the CVA vectorized loop at block 172. The process then continues to decision diamond 173.

Alternatively, if the code is not CVA vectorizable, process flow also continues to decision diamond 173 to determine if some combination of CVA and PVA executions may be used to vectorize the code. If so, the code is vectorized using such a combination at block 174, and its execution speed is estimated at block 175. The process flow then continues to decision diamond 176.

When the code is not vectorizable by either CVA alone or CVA/PVA combination, processing also continues to decision diamond 176 to determine if the code is PVA vectorizable. If so, the code is vectorized using at least one PVA instruction at block 177. Its execution time is estimated in block 178.

At decision diamond 179, a decision is made to determine if the execution speed of the vectorized code has improved over the original loop using any of the abovementioned vectorization methods. If there is no improvement, the original code is unchanged at block 181. If the execution speed has improved, the code is implemented using the best vectorizing method with the fastest execution time, at block 180. In this embodiment, the compiler tries out all possible vectorizing methods and selects the best method among them. In this embodiment, the execution time is used as the only selection criteria. Other embodiments may also incorporate the use of other criteria, such as power consumption, to select the best vectorization method.

Note that alternate embodiments may also incorporate vectorizing a code by first using CVA construct alone. It will then try the CVA/PVA combination only if the code is not CVA vectorizable. If the code is also not vectorizable using any CVA/PVA combination, it will then try to vectorize using PVA construct. In this alternate embodiment, it is recognized that most often the CVA vectorization will produce the greatest improvement in execution speed, followed by a CVA/PVA combination, and finally the PVA vectorization. The process terminates on finding the first method with which the code can be vectorized. These alternate embodiments are advantageous when the profile information used for estimating the execution time is not available. Other alternate embodiments may find some other ordering appropriate for a given application.

According to the present embodiment, the PVA executions are limited to issuing one operation in each cycle. In an alternate embodiment, the PVA executions can be extended to incorporate the capability of issuing multiple independent operations in each cycle, similar to those illustrated in FIG. 2.

One such extension, a dual-issue pseudo-vector machine, is illustrated in FIG. 21, where two independent operations can be issued to two independent function units, P1 235 and P2 234, in each cycle. When executing in a scalar or a PVA mode, two results can be written back to the register file RF 236 or to the memory.

In FIG. 21, register file RF 226, and data streams $L_0$ and $L_1$ independently provide data to multiplexors 228, 230, 231, 232, 233. Multiplexors 228 and 230 provide data to function unit P2 234. Multiplexors 231 and 232 provide data to function unit P1 235. P2 234 provides data to S 236 and RF 226 via result1_bus. P1 235 provides data to multiplexor 237 and S 236. Multiplexor 241 provides data to S 236. S 236 provides data to the memory system via data stream S, and to multiplexors 237 and 241. Multiplexor 237 provides data to RF 226 via result2_bus. It also provides data to multiplexors 228, 230, 231 and 232.

In this dual-issue pseudo-vector machine, there are three types of CVA: compound CVA, reduction CVA and hybrid CVA. The dependency graphs for these three types of CVA are illustrated in FIG. 22. In contrast to the dependency graphs of FIG. 5, in this machine, reduction and hybrid CVA include a three-input arithmetic function, s_op, which has the general form of:

T s_op U s_op V, for scalars T, U and V.

In these dependency graphs, operands W, X, Y and Z can independently source from input stream $L_0$, input stream $L_1$, or a designated register. This operand sourcing mode is referred to herein as independent sourcing mode. Alternatively, each of these operands can also source from a zero-extended upper or lower halfword of an input stream $L_0$ or $L_1$. This operand sourcing mode is referred to herein as cross sourcing mode. Table 6 details the independent sourcing modes and two different cross sourcing modes (cross sourcing modes I and II).

TABLE 6

Possible Sources For Operands W, X, Y and Z

| Operands | Independent Sourcing Mode | Cross Sourcing Mode I | Cross Sourcing Mode II |
|---|---|---|---|
| W | $L_0, L_1$, R0 | $\{0, L_0[31:16]\}$ | $\{0, L_0[31:16]\}$ |
| X | $L_0, L_1$, R4 | $\{0, L_1[15:0]\}$ | $\{0, L_1[31:16]\}$ |
| Y | $L_0, L_1$, R8 | $\{0, L_1[31:16]\}$ | $\{0, L_1[15:0]\}$ |
| Z | $L_0, L_1$, R12 | $\{0, L_0[15:0]\}$ | $\{0, L_0[15:0]\}$ |

In this table, $\{0,L_0[15:0]\}$ denotes the zero-extended lower halfword from the input data stream $L_0$. $\{0, L_0[31:16]\}$ denotes the zero-extended upper halfword from the input data stream $L_0$. Similar notations are used for the $L_1$ stream. The results of these zero-extension operations are 32-bit operands. The general form of a compound CVA can be expressed as $$S_i = (W_i \; p1\_op \; X_i) \; s\_op \; (Y_i \; p2\_op \; Z_i) \; i=0, \ldots, n-1$$

The general form of a reduction CVA can be expressed as $$S_0 = (W_0 \; p1\_op \; X_0) \; s\_op \; (Y_0 \; p2\_op \; Z_0);$$

$$S_i = (W_i \; p1\_op \; X_i) \; s\_op \; (Y_i \; p2\_op \; Z_i) \; s\_op \; S_i-1;$$

$$R = S_{n-1}$$

where $S_i$ denotes the ith partial result, and R denotes the scalar result for the vector reduction operations.

The general form of a hybrid CVA is the same as those of a reduction CVA, except that $S_i$, i=0, . . . ,n−1, is also written to the memory via the S stream.

One of the many uses of cross sourcing mode is for complex vector multiplication, C[i]=A[i]*B[i], i=0, . . . ,n−1, where elements in vectors A, B and C are all complex numbers. A complex number can be represented in the memory system as a concatenation of two 16-bit halfwords, with the upper halfword representing the real part of the complex number, and the lower halfword representing the imaginary part of the complex number. Using this representation, a complex number is fully represented by a 32-bit data.

The result of multiplying two complex numbers, X and Y, is given by (Re X*Re Y−Im X*Im Y)+j (Re X*Im Y+Im X*Re Y), where "Re W" denotes the real part of a complex number W, and "Im W" denotes the imaginary part of the complex number W.

Returning to FIG. 21, a multiplication between two complex vectors, A and B; can be performed by using two compound CVAs. Both of these CVAs stream in vector A via the $L_0$ stream, and vector B via the $L_1$ stream. In both of these CVA, p1_op and p2_op are multiplication functions and s_op is an addition function. The first CVA instruction uses cross sourcing mode I, and produces a result vector that contains the imaginary part of the result vector C. The second CVA instruction uses cross sourcing mode II, and produces a result vector that contains the real part of the result vector C. By using an operand size of two (a halfword) and a stride value of four (one word apart) for stream S, these two CVA instructions can write to the same vector location C, specifically, the two CVA instructions can write to vector C without overwriting each other's results. After executing the two CVA instructions, each element in vector C contains the required real and imaginary values.

The cross sourcing mode described above can also be used for PVA executions. In this case, the two results produced by P1 235, which performs p1_op, and P2 234, which performs p2_op, are independently written back to two distinct registers in the register file RF 226, and/or to the memory system.

The present invention provides a method for processing scalar and vector executions, where vector executions may be "true" vector operations, CVA, or pseudo-vector operations, PVA. All three types of executions are processed using one architecture, on one datapath.

In the foregoing specification, the invention has been described with reference to specific embodiments. However, one of ordinary skill in the art appreciates that various modifications and changes can be made without departing from the scope of the present invention as set forth in the claims below. For example, any software taught herein may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Accordingly, the specification and figures are to be regarded in an illustrative rather than a restrictive sense, and all such modifications are intended to be included within the scope of present invention.

What is claimed is:

1. A data processing system having a first and a second mode of operation, the data processing system comprising:
 a register file having an overlaid register that is programmer visible during the first mode of operation and not programmer visible during the second mode of operation; and
 a temporary register corresponding to the overlaid register that is programmer visible during the second mode of operation and not programmer visible during the first mode of operation.

2. The circuit of claim 1, wherein the first mode is a scalar mode of operation and the second mode is a vector mode of operation, wherein the vector mode of operation is capable of performing true vector operations and pseudo vector operations.

3. The data processing system of claim 1, wherein during the second mode of operation, the overlaid register stores a memory address that is automatically updated by the hardware and the overlay register stores data associated with the memory address.

4. The data processing system of claim 3, wherein during the second mode of operation:
the temporary register is a read only register that is not saved during an interrupt.

5. The data processing system of claim 1, further comprising:
a memory;
a first load unit coupled to the memory and the register file and capable of loading information from the memory;
a second load unit coupled to the memory and the register file and capable of loading information from the memory;
a functional unit coupled to the register file, the first load unit and the second load unit; and
a store unit coupled to the functional unit and the memory.

6. The data processing system of claim 5, wherein:
the functional unit is capable of performing memory store operations and arithmetic operations; and
the first and second load units are capable of providing the information from the memory to at least one of the register file or the functional unit.

7. The data processing system of claim 5, further comprising a loop cache coupled to the memory for storing loop instructions during a vector operation.

8. The data processing system of claim 5, further comprising a temporary memory coupled to the first and second load units and the store unit, wherein the temporary memory includes a random access memory (RAM) capable of storing vectors during a vector operation.

9. In a data processing system capable of vector arithmetic and having a register file, a method comprising:
detecting a program loop; and
translating the program loop into a vectorized code segment that performs a vector instruction, wherein the vector instruction comprises at least one enable field that enables a first data stream to be loaded from memory wherein, based on the vector instruction, the data stream selectively bypasses the register file, and
wherein the vector instruction is one of a pseudo vector arithmetic (PVA) instruction or a true vector arithmetic (CVA) instruction, and wherein execution of the CVA instruction requires a single instruction fetch and execution of the PVA instruction requires a plurality of instruction fetches.

10. The method of claim 9, wherein the first data stream is selected from a group consisting of a first input data stream loaded from memory via a first load unit and an output data stream stored to a memory via a storage unit.

11. The method of claim 10, wherein the enable field further enables a second data stream selected from a group consisting of a second input data stream loaded from memory via a second load unit and an output data stream stored to a memory via a storage unit.

12. The method of claim 9, wherein the vectorized code segment includes at least one initialization instruction.

13. A computer readable medium containing a plurality of instructions for implementing the method of claim 9.

14. The method of claim 9, wherein the first data stream is a first input data stream, and wherein operands corresponding to the vector instruction can independently source from the first input data stream.

15. The method of claim 9, wherein the first data stream is a first input data stream, and wherein operands corresponding to the vector instruction can source from one of an upper halfword and a lower halfword of the first input data stream.

16. In a data processing system capable or vector arithmetic, a method of processing a vector operation comprising:
detecting a program loop; and
translating the program loop into a vectorized code segment that performs a vector instruction, wherein:
the vector instruction enables an implicit store operation that is triggered by an execution of an instruction within the vectorized code segment, wherein the implicit store is initiated upon execution of the instruction within the vectorized code segment.

17. The method of claim 16, wherein the vectorized code segment includes a label to indicate the implicit store operation.

18. The method of claim 17, wherein the vector instruction includes an index field that indicates the instruction that triggers the implicit store operation.

19. The method of claim 16, wherein the vector instruction includes a register field to indicate the implicit store operation as a function of the register number field.

20. The method of claim 19, wherein the register field is associated with the instruction within the vectorized code segment.

21. The method of claim 16, wherein the vector instruction further comprises an enable field that is capable of enabling an output data stream to perform the implicit store from a store unit to a memory.

22. The method of claim 16, wherein the vector instruction further comprises an early termination field to allow early termination of a vector operation.

23. The method of claim 16, further comprising using a mask register to indicate implicit store operations, wherein a first bit within the mask register corresponds to the implicit store operation within the program loop.

24. The method of claim 23, wherein a second bit within the mask register corresponds to another implicit store operation within the program loop.

25. A computer readable medium containing a plurality of instructions for implementing the method of claim 16.

26. In a data processing system, a method comprising:
detecting a program loop;
translating the program loop, wherein:
if the program loop is vectorizable according to true vector processing, translating the program loop into a vectorized code segment that performs a true vector instruction (CVA);
if the program loop is vectorizable according to pseudo-vector processing, translating the program loop into a vectorized code segment that performs a pseudo vector instruction (PVA);
comparing an execution speed of the program loop with an execution speed of the vectorized code segment; and
if the execution speed of the program loop is greater than the execution speed of the vectorized code segment, then utilizing the program loop instead of the vectorized code segment.

27. A computer readable medium containing a plurality of instructions for implementing the method of claim 26.

28. In a data processing system, a method comprising;
detecting a program loop;
translating the program loop, wherein:

if the program loop is vectorizable according to true vector processing, translating the program loop into a vectorized code segment that performs a true vector instruction (CVA);

if the program loop is vectorizable according to pseudo-vector processing, translating the program loop into a vectorized code segment that performs a pseudo vector instruction (PVA); and if a first portion of the program loop is vectorizable according to true vector processing and a second portion of the program loop is vectorizable according to pseudo vector processing:

translating the first portion of the program loop into a first vectorized code segment that performs a true vector instruction; and translating the second portion of the program loop into a second vectorized code segment that performs a pseudo vector instruction.

29. A computer readable medium containing a plurality of instructions for implementing the method of claim 28.

30. In a data processing system, a method comprising:

detecting a program loop;

translating the program loop, wherein:

if the program loop is vectorizable according to true vector processing, translating the program loop into a vectorized code segment that performs a true vector instruction (CVA);

if the program loop is vectorizable according to pseudo-vector processing, translating the program loop into a vectorized code segment that performs a pseudo vector instruction (PVA);

wherein, execution of the CVA instruction requires one instruction fetch and execution of the PVA instruction requires multiple instruction fetches.

31. A computer readable medium containing a plurality of instructions for implementing the method of claim 30.

32. In a data processing system capable of vector arithmetic, a method of processing a vector operation, comprising:

detecting a program loop; and translating the program loop into a vectorized code segment that performs a vector instruction, wherein the vector instruction comprises at least one of an early termination field and an early continuation field, wherein each of the early termination field and the early continuation field is capable of ending a current program loop iteration.

33. The method of claim 32, wherein the ending is based upon a condition code of the data processing system.

34. The method of claim 33, wherein the vector instruction further comprises an offset field to indicate an instruction within the vectorized code segment that affects the condition code.

35. The method of claim 32, wherein the ending is in response to a branch instruction within the program loop.

36. The method of claim 32, wherein the ending occurs prior to completing a full vector operation.

37. The method of claim 32, wherein the vector instruction comprises the early continuation field, the ending occurs prior to completing the current program loop iteration, and the early continuation field allows for a continuation to a subsequent program loop iteration upon ending the current program loop iteration.

38. A computer readable medium containing a plurality of instructions for implementing the method of claim 32.

\* \* \* \* \*

UNITED STATES PATENT AND TRADEMARK OFFICE
CERTIFICATE OF CORRECTION

PATENT NO. : 6,795,908 B1  
APPLICATION NO. : 09/591938  
DATED : September 21, 2004  
INVENTOR(S) : Lea Hwang Lee et al.

It is certified that error appears in the above-identified patent and that said Letters Patent is hereby corrected as shown below:

In Column 36, Line 6, Claim No. 16:

Change "or" to --of--

Signed and Sealed this

Tenth Day of April, 2007

JON W. DUDAS  
*Director of the United States Patent and Trademark Office*